US007428727B2

(12) United States Patent
Alverson et al.

(10) Patent No.: US 7,428,727 B2
(45) Date of Patent: *Sep. 23, 2008

(54) DEBUGGING TECHNIQUES IN A MULTITHREADED ENVIRONMENT

(75) Inventors: Gail A. Alverson, Seattle, WA (US); Burton J. Smith, Seattle, WA (US); Laurence S. Kaplan, Seattle, WA (US); Mark L. Niehaus, Seattle, WA (US)

(73) Assignee: Cray Inc., Seattle, WA (US)

( * ) Notice: Subject to any disclaimer, the term of this patent is extended or adjusted under 35 U.S.C. 154(b) by 805 days.

This patent is subject to a terminal disclaimer.

(21) Appl. No.: 10/937,688

(22) Filed: Sep. 9, 2004

(65) Prior Publication Data

US 2005/0034024 A1     Feb. 10, 2005

Related U.S. Application Data

(63) Continuation of application No. 10/247,276, filed on Sep. 18, 2002, now Pat. No. 6,848,097, which is a continuation of application No. 09/191,985, filed on Nov. 13, 1998, now Pat. No. 6,480,818.

(51) Int. Cl.
G06F 11/00 (2006.01)

(52) U.S. Cl. ............................. 717/134; 714/34; 717/129

(58) Field of Classification Search ................ 717/134
See application file for complete search history.

(56) References Cited

U.S. PATENT DOCUMENTS 4,819,234 A     4/1989   Huber
4,872,167 A    10/1989   Maezawa et al.
5,168,554 A    12/1992   Luke
5,179,702 A *   1/1993   Spix et al. .................. 718/102

(Continued)

FOREIGN PATENT DOCUMENTS

DE        19710252        2/1998

(Continued)

OTHER PUBLICATIONS

Smith, Burton, "The End of Architecture," Keynote Address Presented at the 17th Annual Symposium on Computer Architecture, Seattle, Washington, May 29, 1990.

(Continued)

*Primary Examiner*—Tuan Q. Dam
*Assistant Examiner*—Evral Bodden
(74) *Attorney, Agent, or Firm*—Perkins Coie LLP

(57) ABSTRACT

A system for debugging targets using various techniques, some of which are particularly useful in a multithread environment. These techniques include implementing breakpoints using out-of-line instruction emulation so that an instruction replaced with a breakpoint instruction does not need to be returned to its original location for single-step execution, executing a debugger nub for each target as part of the target task but using a nub task thread for the nub execution that is separate from the target task threads, providing immunity from breakpoints for specified threads such as the nub thread via specialized breakpoint handlers used by those threads, and virtualizing the debugger nub such that a shared root nub provides a uniform interface between the debugger and the target while specialized nubs provide differing functionality based on the type of target being debugged.

47 Claims, 12 Drawing Sheets

U.S. PATENT DOCUMENTS

| | | | |
|---|---|---|---|
| 5,301,325 | A | 4/1994 | Benson |
| 5,333,280 | A | 7/1994 | Ishikawa et al. |
| 5,450,575 | A | 9/1995 | Sites |
| 5,504,932 | A | 4/1996 | Vassiliadis et al. |
| 5,533,192 | A | 7/1996 | Hawley et al. |
| 5,548,717 | A | 8/1996 | Wooldridge et al. |
| 5,557,761 | A | 9/1996 | Chan et al. |
| 5,564,051 | A | 10/1996 | Halliwell et al. |
| 5,581,764 | A | 12/1996 | Fitzgerald et al. |
| 5,594,864 | A | 1/1997 | Trauben |
| 5,598,560 | A | 1/1997 | Benson |
| 5,632,032 | A | 5/1997 | Ault et al. |
| 5,652,889 | A | 7/1997 | Sites |
| 5,712,996 | A | 1/1998 | Schepers |
| 5,754,855 | A | 5/1998 | Miller et al. |
| 5,768,591 | A | 6/1998 | Robinson |
| 5,768,592 | A | 6/1998 | Chang |
| 5,774,721 | A | 6/1998 | Robinson |
| 5,787,245 | A | 7/1998 | You et al. |
| 5,794,046 | A | 8/1998 | Meier et al. |
| 5,805,892 | A | 9/1998 | Nakajima |
| 5,812,811 | A | 9/1998 | Dubey et al. |
| 5,815,653 | A * | 9/1998 | You et al. ............... 714/38 |
| 5,826,265 | A | 10/1998 | Van Huben et al. |
| 5,867,643 | A | 2/1999 | Sutton |
| 5,877,766 | A | 3/1999 | Bates et al. |
| 5,887,166 | A | 3/1999 | Mallick et al. |
| 5,901,315 | A | 5/1999 | Edwards et al. |
| 5,903,730 | A | 5/1999 | Asai et al. |
| 5,913,925 | A | 6/1999 | Kahle et al. |
| 5,953,530 | A | 9/1999 | Rishi et al. |
| 5,961,639 | A | 10/1999 | Mallick et al. |
| 5,966,539 | A | 10/1999 | Srivastava |
| 5,978,902 | A | 11/1999 | Mann |
| 6,002,872 | A | 12/1999 | Alexander, III et al. |
| 6,002,879 | A | 12/1999 | Radigan et al. |
| 6,009,269 | A | 12/1999 | Burrows et al. |
| 6,029,005 | A | 2/2000 | Radigan |
| 6,042,614 | A * | 3/2000 | Davidson et al. ............ 717/116 |
| 6,049,671 | A | 4/2000 | Slivka et al. |
| 6,058,493 | A | 5/2000 | Talley |
| 6,059,840 | A | 5/2000 | Click, Jr. |
| 6,072,952 | A | 6/2000 | Janakiraman |
| 6,101,524 | A | 8/2000 | Choi et al. |
| 6,112,293 | A | 8/2000 | Witt |
| 6,151,701 | A | 11/2000 | Humphreys et al. |
| 6,151,704 | A | 11/2000 | Radigan |
| 6,158,045 | A * | 12/2000 | You ........................ 717/124 |
| 6,167,358 | A | 12/2000 | Othmeer et al. |
| 6,282,701 | B1 | 8/2001 | Wygodny et al. |
| 6,480,818 | B1 | 11/2002 | Alverson et al. |
| 6,658,650 | B1 | 12/2003 | Bates |
| 6,681,384 | B1 | 1/2004 | Bates et al. |
| 6,978,444 | B1 * | 12/2005 | Farchi et al. ............... 717/129 |

FOREIGN PATENT DOCUMENTS

| | | |
|---|---|---|
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

Richard Korry et al., "Memory Management in the Tera MTA System," 1995.

Gail Alverson et al., "Processor Management in the Tera MTA System," 1995.

Major System Characteristics of the TERA MTA, 1995.

Touzeau, Roy F., "A Fortran Compiler for the FPS-164 Scientific Computer," Proceedings of the ACM SIGPLAN '84 Symposium on Compiler Construction, SIGPLAN Notices 19(6):48-57, Jun. 1984.

Linton, Mark A., The Evolution of Dbx, USENIX Summer Conference, Jun. 11-15, 1990.

David Callahan and Burton Smith, A Future-Based Parallel Language for a General-Purpose Highly-Parallel Computer, Languages and Compilers for Parallel Computing, MIT Press, 1990.

David Callahan et al., "Improving Register Allocation for Subscripted Variables," Proceedings of the ACM SIGPLAN Conference on Programming Language Design and Implementation, White Plains, New York, Jun. 20-22, 1990.

Adelberg, Brad et al., "The Strip Rule System for Efficiently Maintaining Derived Data," Sigmod Record, Association for Computing Machinery, New York, vol. 26, No. 2, Jun. 1, 1997.

Surajit, Chaudhuri and Umeshwar Dayal, "An Overview of Data Warehousing and OLAP Technology," Sigmod Record, Association for Computing, New York, vol. 26, No.1, Mar. 1997.

Agrawal, Gagan and Joel Saltz, "Interprocedural Data Flow Based Optimizations for Compilation of Irregular Problems," Annual Workshop on Languages and Compilers for Parallel Computing, 1995.

Callahan, David, "Recognizing and Parallelizing Bounded Recurrences," Aug. 1991.

D.H. Bailey et al., "The NAS Parallel Benchmarks—Summary and Preliminary Results," Numerical Aerodynamic Simulation (NAS) Systems Division, NASA Ames Research Center, California, 1991.

Robert Alverson et al, "The Tera Computer System,"Proceedings of 1990 ACM International Conference on Supercomputing, Jun. 1990.

Gail Alverson et al., "Scheduling on the Tera MTA," Job Scheduling Strategies for Parallel Processing, 1995.

Briggs, Preston and Keith D. Cooper, "Effective Partial Redundancy Elimination," ACM SIGPLAN Notices, Association for Computing Machinery, New York, vol. 29, No. 6, Jun. 1, 1994.

Click, Cliff, "Global Code Motion, Global Value Numbering," ACM SIGPLAN Notices, Association for Computing Machinery, New York, vol. 30, No. 6, Jun. 1, 1995.

Sreedhar, Vugranam C. and Guang R. Gao, "Incremental Computation of Dominator Trees," ACM SIGPLAN Notices, Association for Computing Machinery, New York, vol. 30, No. 3, Mar. 1, 1995.

Galarowicz, Jim et al., "Analyzing Message Passing Programs on the Cray T3E with PAT and VAMPIR," Research Report, "Online!", May 1998.

Anderson, Jennifer, et al., "Continuous Profiling: Where Have All The Cycles Gone?," Operating Systems Review, ACM Headquarters, New York, vol. 31, No. 5, Dec. 1, 1997.

Smith, Burton, "Opportunities for Growth in High Performance Computing," Nov. 1994.

Goldman, Kenneth, J., "Introduction to Data Structures," 1996, Retrieved from Internet http://www.cs.wustl.edu/{kjg/CS101_SP97/Notes?DataStructures/structures.html.

A. Ram., et al., "Parallel Garbage Collection Without Synchronization Overhead," 12th Annual Symposium on Computer Architecture, Jun. 17, 1985.

H. Hayashi et al., "ALPHA: A High Performance Lisp Machine Equipped with a New Stack Structure and Garbage Collection System," 10th Annual International Symposium on Computer Architecture, 1983.

Jack W. Davidson and David B. Whalley, "Reducing the Cost of Branches by Using Registers," Proceedings of the 17th Annual Symposium on Computer Architecture, Seattle, Washington, May 28-31, 1990.

Jens Knoop et al., "The Power of Assignment Motion," ACM SIGPLAN '95 Conference on Programming Language Design and Implementation, La Jolla, California, Jun. 18-21, 1995.

Hiralal Agrawal, "Dominators, Super Blocks, and Program Coverage," 21st ACM SIGPLAN-SIGACT Symposium on Principles of Programming Languages, Portland, Oregon, Jan. 17-21, 1994.

Tomas Lang and Miquel Huguet, "Reduced Register Saving/Restoring in Single-Window Register Files," Computer Architecture News, vol. 14, No. 3, Jun. 1986.

Lal George and Andrew W. Appel, "Iterated Register Coalescing," ACM Transactions on Programming Languages and Systems, vol. 18, No. 3, May 1996, pp. 300-324.

Fred C. Chow and John L. Hennessy, "The Priority-Based Coloring Approach to Register Allocation," ACM Transactions on Programming Languages and Systems, vol. 12, No. 4, Oct. 1990, pp. 501-536.

Preston Briggs et al., "Coloring Heuristics for Register Allocation," Department of Computer Science, Rice University, Houston, Texas, Jun. 1989.

Preston Briggs et al., "Coloring Register Pairs," ACM Letters on Programming Languages and Systems, vol. 1, No. 1, Mar. 1992, pp. 3-13.

Ji Minwen et al., "Performance Measurements for Multithreaded Programs," SIGMETRICS '98, ACM, 1998, pp. 168-170.

Jonathan E. Cook and Alexander L. Wolf, "Event Based Detection of Concurrency," SIGSOFT '98, ACM, 1998, pp. 35-45.

Jenn-Yuan Tsai et al., "Performance Study of a Concurrent Multithreaded Processor," IEEE, 1998, pp. 24-35.

"Method of Tracing Events in Multi-Threaded OS/2 Applications," IBM Tech. Disclosure Bulletin, Sep. 1993, pp. 19-22.

Priyadarshan Kolte and Mary Jean Harrold, "Load/Store Range Analysis for Global Register Allocation," ACM-SIGPLAN, Jun. 1993.

SangMin Shim and Soo-Mook Moon, "Split-Path Enhanced Pipeline Scheduling for Loops with Control Flows," IEEE, Dec. 2, 1998.

David Callahan and Brian Koblenz, "Register Allocation via Hierarchical Graph Coloring," Proceedings of the ACM SIGPLAN '91 Conference on Programming Language Design and Implementation, Toronto, Canada, Jun. 26-28, 1991.

Tera MTA, Principles of Operation, Nov. 18, 1997.

Kenneth J. Goldman, "Introduction to Data Structures," 1996 (retrieved from the Internet, http://www.cs.wustl.edu/{kjg/CS101_SP97/Notes?DataStructures/structures.html.

Ashwin Ram and Janak N. Patel, "Parallel Garbage Collection Without Synchronization Overhead," 12th Annual Symposium on Computer Architecture, Jun. 17, 1985.

Hiromu Hayashi et al., "ALPHA: A High Performance Lisp Machine Equipped with a New Stack Structure and Garbage Collection System," 10th Annual International Symposium on Computer Architecture, 1983.

Sistare, Steve, et al., "A Scalable Debugger for Massively Parallel Message-Passing Programs," IEEE 1994, pp. 50-56.

Keyes, David S., et al., "Analysis of a Scheduler for a CAD Framework," ACM 1999, pp. 152-161.

Lumpp, James E. Jr., et al., "CAPS: A Coding AID for PASM," ACM 1991, pp. 104-117.

Wu, Le-Chun, et al., "A New Framework for Debugging Globally Optimized Code," ACM 1999, pp. 181-191.

* cited by examiner

| Address | Instruction |
|---------|-------------|
| 001996  |             |
| 001997  | :           |
| 001998  | LOOP for Z from 10 to 20 |
| 001999  | X+=1        |
| 002000  | Y=X * Z     |
| 002001  | FOO(Y)      |
| 002002  | END LOOP    |
| 002003  | :           |

*Fig. 4A*

| Address | Instruction |
|---------|-------------|
| 001996  |             |
| 001997  |             |
| 001998  | LOOP for Z from 10 to 20 |
| 001999  | X+=1        |
| 002000  | BREAK       |
| 002001  | FOO(Y)      |
| 002002  | END LOOP    |
| 002003  |             |
|         | :           |
| 004999  | Subroutine OOL-IEG-1 |
| 005000  | Restore target thread environment |
| 005001  | Y=X * Z     |
| 005002  | Save changes in target thread environment including new PC to save area |
| 005003  | RETURN      |
| 005004  | :           |

Out-Of-Line Instruction Emulation Group: 004999–005003

*Fig. 4B*

DEBUGGING TECHNIQUES IN A MULTITHREADED ENVIRONMENT

CROSS-REFERENCE TO PRIOR APPLICATION

This application is a continuation of U.S. patent application Ser. No. 10/247,276, filed Sep. 18, 2002 now U.S. Pat. No. 6,848,097, which is a continuation of U.S. patent application Ser. No. 09/191,985, filed Nov. 13, 1998, now U.S. Pat. No. 6,480,818, issued Nov. 12, 2002, which are hereby incorporated by reference.

TECHNICAL FIELD

This invention relates generally to debugger techniques for computer systems.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0-R31"), and eight 32-bit Target Registers ("T0-T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target is registers as branch targets. However, most control transfer operations only use the low 32 bits to determine a new program counter. One target register (T0) points to the trap handler, which may be an unprivileged routine. When the trap handler is invoked, the trapping stream starts executing instructions at the program location indicated by register T0. Trap handling is thus lightweight and independent of the operating system ("OS") and other streams, allowing the processing of traps to occur without OS interaction.

Each MTA processor supports as many as 16 active protection domains that define the program memory, data memory, and number of streams allocated to the computations using that processor. The operating system typically executes in one of the domains, and one or more user programs can execute in the other domains. Each executing stream is assigned to a protection domain, but which domain (or which processor, for that matter) need not be known by the user program. Each task (i.e., an executing user program) may have one or more threads simultaneously executing on streams assigned to a protection domain in which the task is executing.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities slim, scur, and sres associated with each protection domain. The current numbers of streams executing in the protection domain is indicated by scur; it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev" operation sets the current privilege level to the program page map level if the current level is equal to lev. The LEVEL_ENTER operation is located at every entry point that can accept a call from a different privilege level. A trap occurs if the current level is not equal to lev. The "LEVEL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled, assuming that the bit is still set in the exception register. The operating system can execute an operation to raise a domain signal exception in all streams of a protection domain. If the trap for the domain signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overidden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory References. The synchronization behavior can be controlled by the full/empty control bits of a pointer or of a load or store operation. The four values for the full/empty control bits are shown below.

| VALUE | MODE | LOAD | STORE |
| --- | --- | --- | --- |
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of the memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty bit is set to full, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location, returns the loaded value as the result of the operation, and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

A speculative load occurs typically when a compiler generates code to issue a load operation for a data value before it is known whether the data value will actually be accessed by the program. The use of speculative loads helps reduce the memory latency that would result if the load operation was only issued when it was known for sure whether the program actually was going to access the data value. Because a load is speculative in the sense that the data value may not actually be needed by the program, it is possible that a speculative load will load a data value that the program does not actually use. The following statements indicate program statement for which a compiler may generate a speculative load:

```
if i<N
x=buffer[i]
endif
```

The following statement illustrate the speculative load that is placed before the "if" statement.

```
r=buffer[i]
if i<N
x=r
endif
```

The compiler has generated code to load the data value for buffer[i] into a general register "r" and placed it before the code generated for the "if" statement condition. The load of the data value could cause an exception, such as if the index i was so large that an invalid memory location was being accessed. However, the necessity of this exception is uncertain at that time since the invalid memory location will not be accessed by the original code unless the "if" statement condition is satisfied (i.e., i<N). Even if the "if" statement condition is satisfied, the exception would not have occurred until a later time. To prevent a speculative load from causing an exception to occur or occur too early, the MTA has a "poison" bit for each general register. Whenever a load occurs, the poison bit is set or cleared depending on whether an exception would have been raised. If the data in a general register is then used while the corresponding poison bit is set, then an exception is raised at the time of use. In the above example, the "r=buffer[i]" statement would not raise an exception, but would set the corresponding poison bit if the address is invalid. An exception, however, would be raised when the "x=r" statement is executed accessing that general register because its poison bit is set. The deferring of the exceptions and setting of the poison bits can be disabled by a speculative load flag in the SSW.

FIG. 2A illustrates the layout of the 64-bit exception register. The upper 32-bits contain the exception flags, and the lower 32 bits contain the poison bits. Bits 40-44 contain the flags for the user exceptions, which include a create stream exception, a privileged instruction exception, a data alignment exception, and a data blocked exception. A data blocked exception is raised when a data memory retry exception, a trap 0 exception, or a trap 1 exception is generated. The routine that is handling a data blocked exception is responsible for determining the cause of the data blocked exception. The exception register contains one poison bit for each of the 32 general registers. If the poison bit is set, then an attempt to access the content of the corresponding register will raise an exception.

FIG. 2B illustrates the layout of the 64-bit stream status word. The lower 32 bits contain the program counter, bits 32-39 contain mode bits, bits 40-51 contain a trap mask, and bits 52-63 contain the condition codes of the last four instructions executed. Bit 37 within the mode bits indicates whether speculative loads are enabled or disabled. Bit 48 within the trap mask indicates whether a trap on a user exception is enabled (corresponding to bits 40-44 of the exception register). Thus, traps for the user exceptions are enabled or disabled as a group.

FIG. 2C illustrates the layout of a word of memory, and in particular a pointer stored in a word of memory. Each word of memory contains a 64-bit value and a 4-bit access state. The 4-bit access state is described above. When the 64-bit value is used to point to a location in memory, it is referred to a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set, then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

When a memory operation fails (e.g., synchronized access failure), an MTA processor saves the state of the operation. A trap handler can access that state. That memory operation can be redone by executing a redo operation (i.e., DATA_OP_REDO) passing the saved state as parameters of the operation. After the memory operation is redone (assuming it does not fail again), the trapping stream can continue its execution at the instruction after the trapping instruction.

The appendix contains the "Principles of Operation" of the MTA, which provides a more detailed description of the MTA.

While the use of a multithreaded architecture provides various benefits for the execution of computer programs, multithreaded architectures also add various complexities to the development and testing of application programs. Debugger programs, used to control execution of other executable code in order to identify errors and obtain information about the execution, are one type of application program which may face additional complexities in a multithreaded environment but may also benefit from capabilities of the environment.

For example, a common feature in debugger programs is the ability to set one or more breakpoints in the target code (i.e., the code to be debugged). When the executing target code encounters such a breakpoint, execution is halted and control of the target code execution is transferred to the debugger. On sequential machines (i.e., those with only one thread can execute at a time), breakpoints are often implemented by replacing an instruction in the target code with a breakpoint instruction to halt execution of the target code (e.g., a trap instruction or a jump to the debugger). At some point after execution of the target code has been halted by a breakpoint, a user of the debugger will indicate that execution of the target code should resume.

Upon receiving the indication to resume, the debugger first executes the replaced instruction in-line with the rest of the target code (i.e., at the memory location in which the code was originally loaded) before continuing execution. This in-line execution is accomplished by temporarily returning the replaced instruction to its original position in the target code, executing the next instruction of the target code (i.e., single stepping the target code) so that the replaced instruction is executed, re-replacing the replaced instruction with the breakpoint instruction so that future executions of this code will encounter the breakpoint, and then resuming execution of the target code at the instruction to be executed following the replaced instruction in the execution sequence. In-line execution allows the replaced instruction to be executed in the location in which it was originally loaded and in its original execution environment (e.g., using the current state of current register and stack values).

While the described breakpoint technique is appropriate for sequential machines, problems arise when this technique is used in a multithreaded environment. For example, when the replaced instruction is temporarily returned to the target code for the single-step in-line execution, other threads may execute the replaced instruction instead of the breakpoint. Thus, some threads may not break even though a valid breakpoint has been installed.

Debugger programs face other difficulties in providing desired capabilities regardless of whether execution occurs in sequential or multithreaded architectures. For example, in addition to setting breakpoints, debuggers often provide the capabilities to set watch points for monitoring when a value in a memory location changes, to evaluate user-supplied expressions in the current context of the target code, to single-step the evaluation of the target code, etc. To implement such capabilities, debuggers typically rely on OS support to obtain information about the state of the target code (e.g., values currently stored in memory locations) and to perform operations such as replacing a target code instruction with a breakpoint instruction. However, the level of support available can vary with different OSes, and the types of support may also vary with the type of target code. For example, debugging of an operating system typically requires a separate debugger (e.g., a kernel debugger) than for a user application program, and different debuggers may be needed for application programs written in different computer languages (e.g., Java, C++, or Fortran).

Another debugger difficulty arises if a breakpoint has been set on an instruction that is used by the debugger as well as by the target code (e.g., on a function in a shared library or on a commonly used function such as 'print'). If the debugger executes the breakpoint, execution of the debugger may halt with no means to resume the execution. Thus, various steps must be taken to ensure that the debugger will not perform breakpoints. One memory-intensive approach that addresses this problem involves creating separate copies of any shared function so that the breakpoint set in the target code copy of the function will not be present in the debugger copy of the function.

Finally, when a debugger is not available to locate an error in target code or when only static dump state information (i.e., various information about the state of a computer system near the moment of system crash, such as a memory core dump or hardware scan file) for the target code is available, analysis of the static dump state information may be the only debugging recourse. Such analysis is typically performed manually by reviewing bit values, a time-consuming process which may reveal only limited information.

SUMMARY OF THE INVENTION

Embodiments of the present invention provide various techniques for debugging targets. These techniques include implementing breakpoints using out-of-line instruction emulation so that an instruction replaced with a breakpoint instruction does not need to be returned to its original location for execution, executing a debugger nub for each target as part of the target task but using a nub task thread for the nub execution that is separate from the target task threads, providing immunity from breakpoints for specified threads such as the nub thread via specialized breakpoint handlers used by those threads, and virtualizing the debugger nub such that a shared root nub provides a uniform interface between the debugger and the target while specialized nubs provide differing functionality based on the type of target being debugged.

In one embodiment, a method for debugging a task executing on a computer system having a processor with multiple streams for executing threads of the task is used. In this embodiment, the method involves executing a debugger nub of a specialized type using one thread of the task, with the specialized type of the debugger nub chosen based on a type of the task and with the debugger nub thread having a breakpoint handler distinct from breakpoint handlers of the other task threads. When the debugger nub thread receives a request from a debugger to set a breakpoint at a specified location in the task, the request is performed in a specialized manner, determined by the specialized type, by identifying an executable instruction at the specified location, generating a group of instructions for emulating the identified instruction out-of-line at a location other than the specified location, loading the generated group of instructions into the other location, and replacing the identified instruction at the specified location with an inserted instruction that when executed will create a break. When a thread other than the debugger nub thread encounters the inserted instruction, the identified instruction is executed by transferring control of execution for the thread to the breakpoint handler for the thread, notifying the debugger nub of the encounter with the inserted instruction so that the debugger nub can notify the debugger of the encounter, and after receiving an indication from the debugger via the debugger nub to resume execution, executing the group of instructions loaded at the other location. When the debugger nub thread encounters the inserted instruction, the identified instruction is executed by transferring control of execution for the nub thread to the breakpoint handler for the nub thread, and by executing the group of instructions loaded at the other location without notifying the debugger of the encounter and without receiving an indication from the debugger to resume execution. When the debugger nub thread receives a request from another thread to perform an action for the another thread, any exceptions that occur during performing of the action are masked so that execution of the debugger nub is not halted and so that the debugger nub can notify the debugger of the exceptions.

BRIEF DESCRIPTION OF THE DRAWINGS

FIGS. 4A and 4B illustrate setting a breakpoint using a breakpoint implementation embodiment of the present invention.

DETAILED DESCRIPTION OF THE INVENTION

Embodiments of the present invention provide various techniques for debugging targets. In particular, the techniques include implementing breakpoints using Out-Of-Line (OOL) instruction emulation so that an instruction replaced with a breakpoint instruction does not need to be returned to its original location for execution, executing a debugger nub for each target as part of the target task but using a nub task thread for the nub execution that is separate from the target task threads (i.e., the threads executing target code), providing immunity from breakpoints for specified threads (e.g., the nub thread) via specialized breakpoint handlers used by those threads, and virtualizing the debugger nub such that a shared root nub provides a uniform interface between the debugger and the target while specialized nubs provide differing functionality based on the type of target being debugged.

Figure 1:
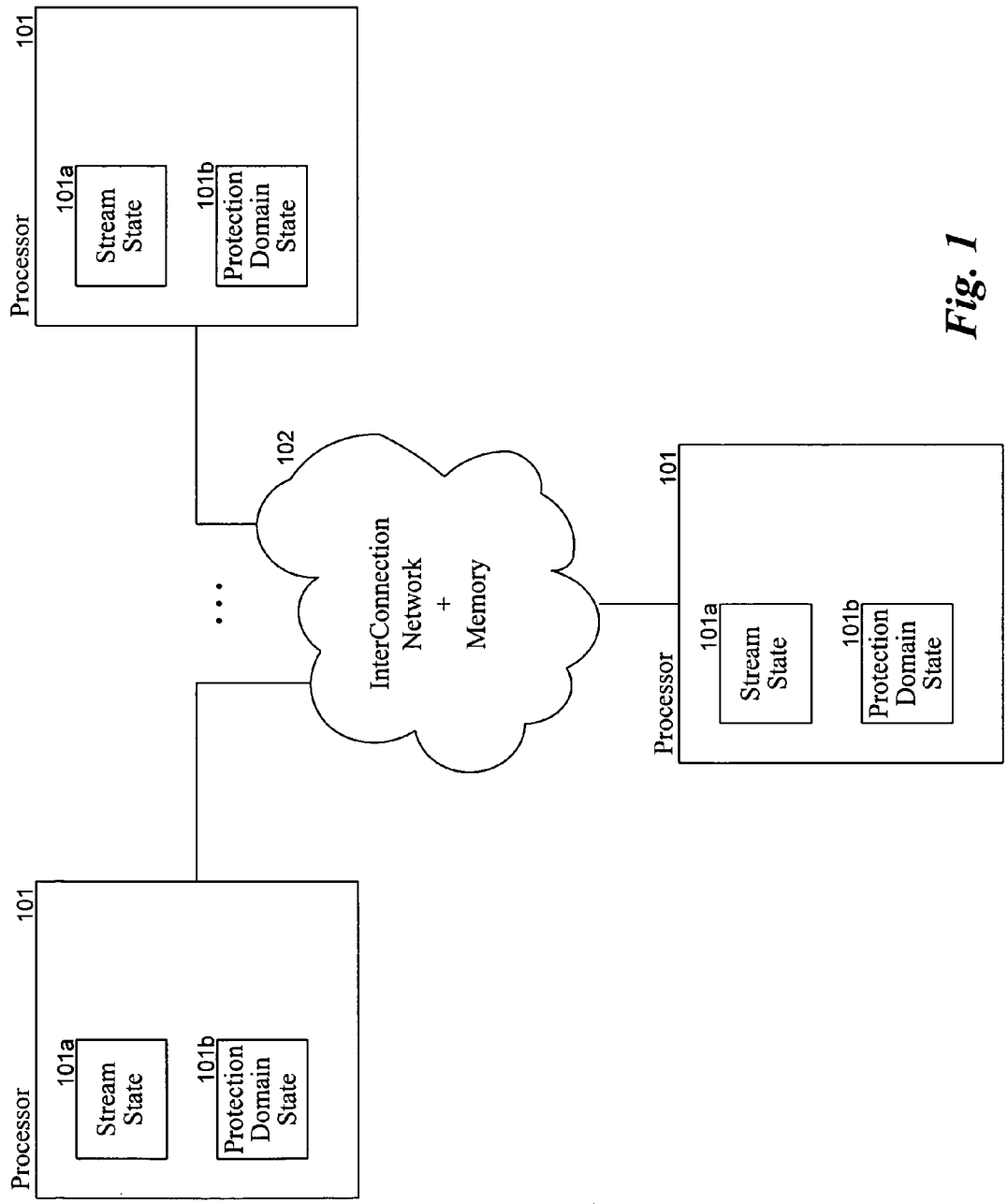
FIG. 1 provides a high-level overview of an MTA computer, with each processor 101 connected to the interconnection network and memory 102.
Figure 2A:
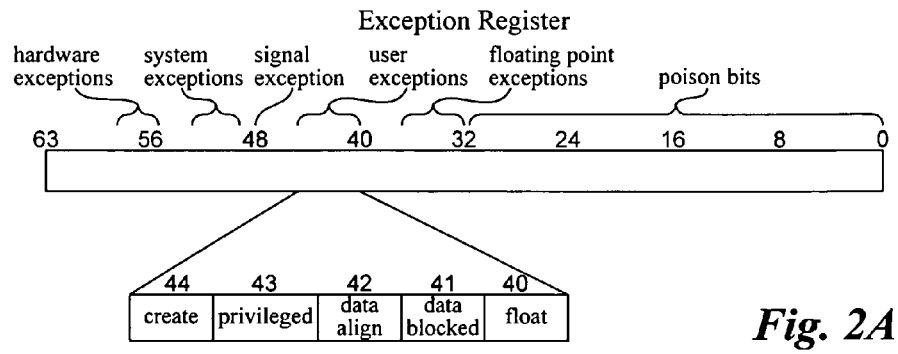
FIG. 2A illustrates the layout of the 64-bit exception register.
Figure 2B:
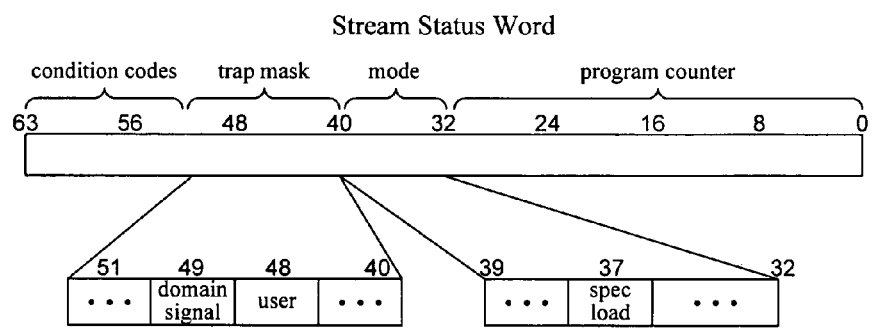
FIG. 2B illustrates the layout of the 64-bit stream status word.
Figure 2C:
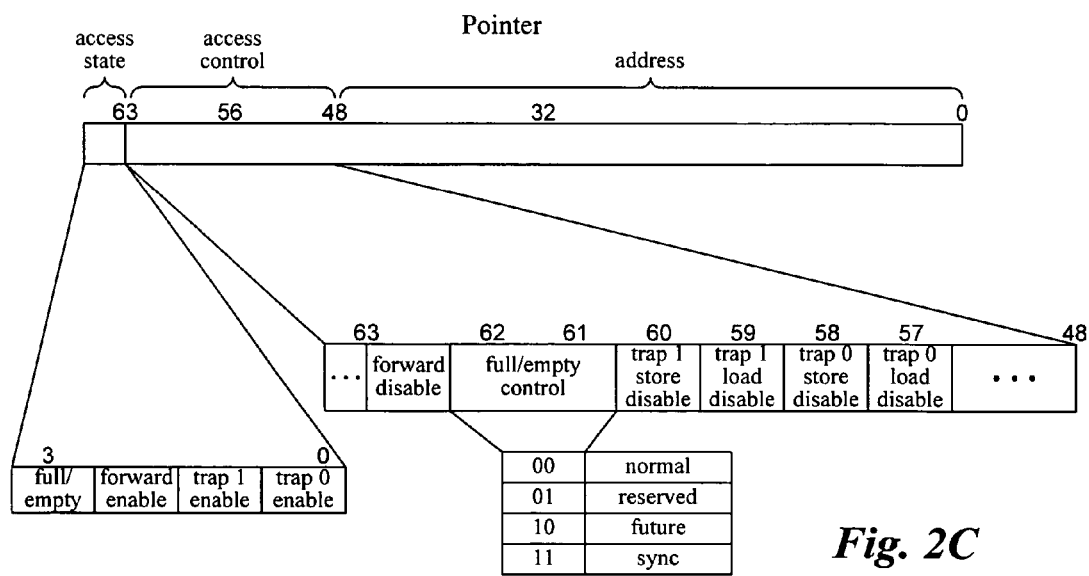
FIG. 2C illustrates the layout of a word of memory, and in particular a pointer stored in a word of memory.
Figure 3:
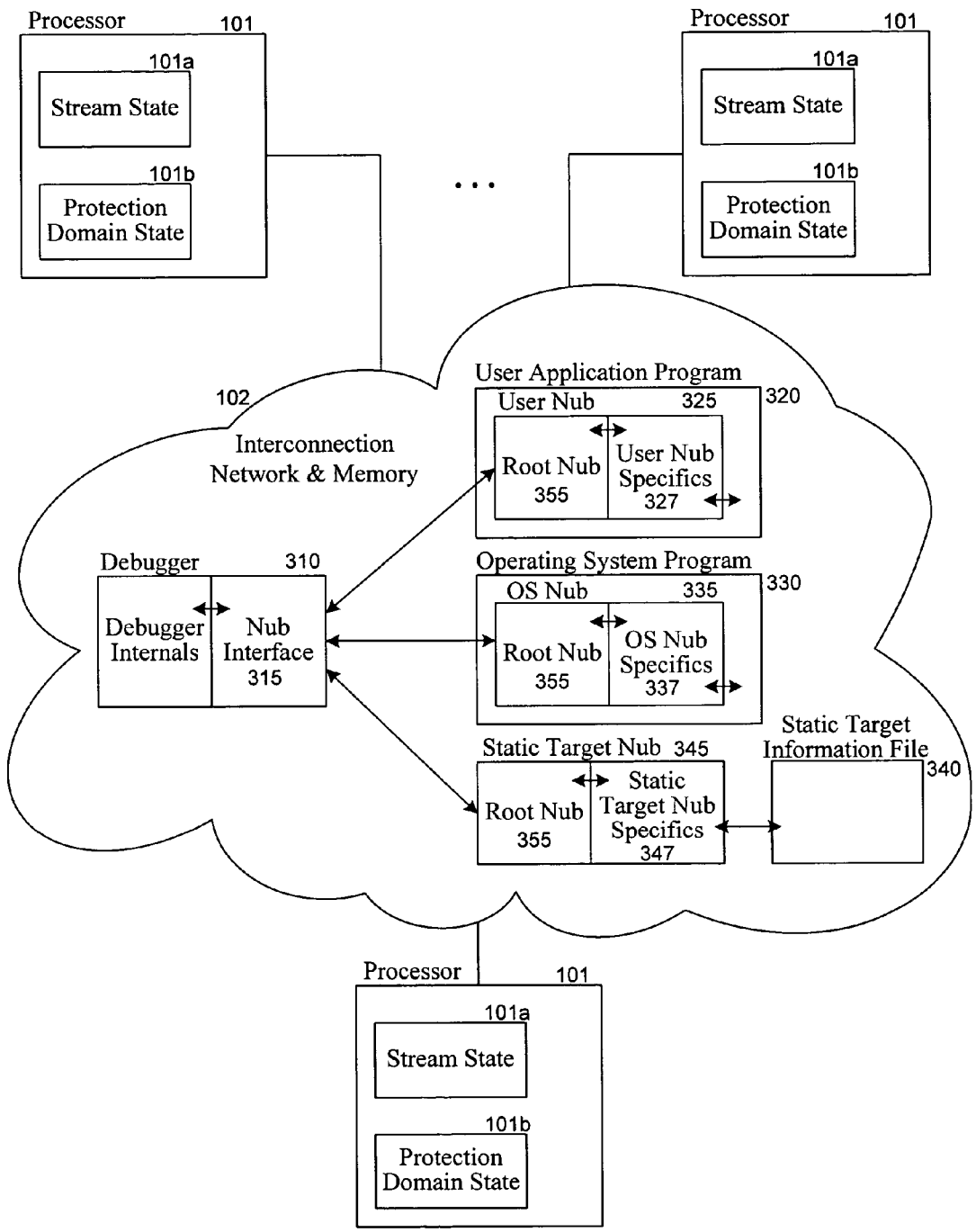
FIG. 3 is a block diagram illustrating an embodiment of the debugger techniques of the present invention.

FIG. 3 is a block diagram illustrating an embodiment of a debugger using techniques of the present invention. As described in the background, debugger programs control the execution of target code and can retrieve information about the current state of a target. Techniques of the present invention allow a debugger to uniformly access a variety of differing types of targets, including executing user application programs, executing operating system programs, and static dump state information files. Those skilled in the art will appreciate that some types of debugger capabilities may not be supportable for some types of targets (e.g., setting breakpoints and resuming execution may not be available for static dump state information files).

In the illustrated embodiment, the debugger program 310 interacts with the nubs 325, 335, and 345 in a uniform manner to obtain state information about executing target user application program 320, executing target OS program 330, and static target dump state information file 340 respectively as well as to control execution of programs 320 and 330. The debugger program can interact with one or more nubs either concurrently or sequentially, and the interaction can be performed in a variety of ways (e.g., socket-based message passing). In addition, the debugger can execute on the MTA computer as shown, or can execute on a separate host computer (not shown) in communication with the MTA computer. Similarly, a nub such as the static target nub can also execute on a separate computer, and can retrieve information from the static target information file as stored on the MTA computer or as loaded onto the separate computer.

As is shown, the debugger program uses a single nub interface 315 to uniformly communicate with the root nub portions 355 of each of the nubs 325, 335, and 345. The nubs 325, 335, and 345 also contain specialized nub portions 327, 337 and 347 respectively that receive debugger messages from their root nubs 355, and that use target-specific functionality to respond to the messages (e.g., to set breakpoints and to evaluate expressions in the target context) for their targets. Those skilled in the art will appreciate that the illustrated components are merely illustrative and are not intended to limit the scope of the present invention. For example, only a single processor may be available or a very large number of processors could be available. In addition, some or all of the processors could be executing other tasks at the same time as executing the illustrated tasks. Moreover, those skilled in the art will appreciate that the debugger programs and the various targets can be executing on a single processor or each on a different processor. Accordingly, the present invention may be practiced with other computer system configurations.

When the debugger interacts with executing targets such as programs 320 and 330, the corresponding nubs execute as part of the executing targets. Since those nubs are part of the executing targets, the nubs can gather information about the executing targets (e.g., by directly reading target memory) without requiring support from any other programs. For example, the debugger can interact with nub 325 to implement debugger capabilities for user program 320 without requiring any OS support. In some embodiments, the nubs execute using a nub thread that is part of the executing target task but that is separate from other target threads. In those embodiments, the nub thread executes at the same privilege level as the other target threads and can gather information about those other threads. Those skilled in the art will appreciate that when a target is executed in parallel on multiple processors, various additional steps may need to be taken by the debugger or by the debugger nubs. For example, a nub may need to be executed for each processor, or instead a single nub may coordinate all target threads across the multiple processors. In addition, if a separate copy of the target is created for each of the processors, then when setting breakpoints the breakpoint will need to be added to each copy of the target.

When the debugger instead interacts with a static target such as file 340, the nub can execute in a variety of ways, such as a stand-alone task, as part of the debugger, or as part of some other task. Those skilled in the art will appreciate that nub code can be added to targets in a variety of ways, such as by adding the nub code to the target during compilation, by inserting nub code into the compiled target before execution, or by passing an executable object or message to an executing target.

Implementing a debugger nub using a separate thread within an executing target provides various benefits. As previously described, each thread of a task can execute a trap independently of other task threads and without OS support. When an exception causes a trap to occur, a trap handler is invoked that saves the state of the executing thread in a save area for the thread. This general trap handler then determines the type of exception that caused the trap, and invokes an exception trap handler that is appropriate for the exception. Those skilled in the art will appreciate that the various trap handlers can be dynamically modifiable, such as by using registers or a memory jump table to contain the addresses for the currently defined trap handlers.

In some embodiments, breakpoints are implemented by inserting a breakpoint instruction in target code that will cause an exception when executed by the target thread. The breakpoint exception handler, executing on the target thread's stream, can then interact with the nub thread to allow interactive debugger control over the trapping thread and over the target in general. As previously indicated, the nub thread can gather information about the target thread that caused the exception (e.g., from the save area for the thread) as well as about other target threads.

Since each thread performs trap handling separate from other threads, different general trap handlers and/or different specialized exception trap handlers can be specified for different threads executing as part of a single task. This allows different threads to implement specific trap capabilities without loss of efficiency. Moreover, since installation and modification of trap and exception handlers are not privileged instructions, the target program itself can modify the trap handlers for task threads. Specialized trap and exception handlers allow the nub thread to process exceptions differently than target threads.

One reason for the nub to handle exceptions differently than target threads arises when the nub thread encounters a breakpoint when executing its own code. Since part of implementing a breakpoint involves the nub interacting with the debugger, halting the debugger due to the breakpoint is undesirable. A specialized breakpoint handler for the nub thread provides immunity to breakpoints, allowing the nub to pass breakpoints without halting.

It is also often desirable for the nub to rebind (e.g., temporarily modify) any fatal trap handlers while doing certain types of debugger nub work so that execution of the nub is not prematurely halted due to an error. An example of this situation arises when the nub is evaluating the condition on a conditional breakpoint on behalf of a target thread. If the condition specified by the user of the debugger is bad and would normally cause a fatal exception, it is desirable to inform the user of that fact and of the details of the exception rather than allowing the target to crash. Avoiding such a crash can be accomplished by rebinding the fatal handlers for the nub to versions that, upon encountering an error, unwind that evaluation and return the appropriate error information to the user.

In other situations, it is desirable for threads to temporarily or permanently mask some exceptions. For example, it can be necessary to asynchronously signal all running threads in a task for a variety of reasons, such as to halt execution of the task so that the current state of the task can be examined. Similarly, in some embodiments it may be desirable to halt all threads when any thread encounters a breakpoint. In such embodiments, it is particularly useful to use out-of-line instruction emulation so that when the condition of a encountered conditional breakpoint is false, the thread that encountered the breakpoint can merely execute the out-of-line instruction emulation and continue execution without needing to unnecessarily halt the other threads.

An asynchronous signal sent to all running threads of a task is referred to as a domain signal. If a domain signal is used in a debugging context to manipulate target threads, it is desirable for the nub to ignore the domain signal. Thus, in some embodiments the nub will permanently mask the domain signal. It may also be necessary for some target threads to temporarily mask the domain signal. For example, if the nub needs to access various data structures of the target threads, the data structures must be in a consistent and unlocked state. This requires that the domain signal be masked while these data structures are accessed or these locks are held. Thus, in some embodiments these data structures and locks are designed to automatically mask domain signals while they are being accessed or held. After the debugger nub raises the domain signal (or asks the OS to do so), it waits for all threads to respond to the domain signal before accessing the data structures, thus ensuring that the data structures are in the proper state.

As previously mentioned, the debugger nub is virtualized so that a root nub provides a uniform interface to the debugger while nubs specialized for different types of targets implement some debugger functionality in target-specific manners. In some embodiments, object-oriented techniques are used (e.g., using C++) such that the root nub is implemented as a class and the specialized nubs as derived classes of the root nub class. For example, user nub, OS nub, and static dump state information nub classes can be specialized derived classes of the root nub class that correspond respectively to application programs invoked by a user, the operating system, and various types of static dump state information. Those skilled in the art will appreciate that multiple levels of specialization can be used, such as having derived classes of the static dump state information nub class that correspond to nubs for a scanned hardware state, for an operating system core dump, and for an application program core dump.

Regardless of which specialized nub is in use, functionality provided by the root nub is used to provide a uniform interface to the debugger. In some embodiments, this uniform interface implements low-level communication protocols (e.g., get-packet), while higher-level debugger functionality (e.g., set-breakpoint and evaluate-expression) is implemented in a target-specific manner by some or all specialized nubs. When object-oriented techniques are used, the root nub can define the interfaces for all of the functions that can be invoked by the debugger. For those functions which are implemented uniformly for all nubs, the root nub can provide a public implementation of the function that is not specialized by the derived class nubs. For those functions which may be implemented in a target-specific manner by some or all specialized nubs, the root nub can provide virtual functions (e.g., pure virtual functions) which can be specialized by some or all of the nub derived classes.

Target-specific debugger functions may be needed in a variety of situations. For example, setting a breakpoint involves modifying the program memory of the target. This may be a privileged operation that can be performed by the operating system (and thus the OS nub), but cannot be directly performed by an application program (and thus the user nub). In this case, the user nub would need to implement the set-breakpoint functionality differently than the OS nub. Also, as previously mentioned some types of targets may not support all of the available debugger capabilities. Thus, the static dump state information nub may need to implement the resume-stream-execution functionality by notifying the debugger that this functionality is not currently available. Alternately, the default inherited resume-stream-execution functionality from the root nub might provide this functionality, and the OS and user nubs may specialize the function with implementations appropriate for their target environments. Other distinctions between targets which may require specialization of functionality include how data structures for target threads are stored (e.g., needed to perform expression evaluation) and how other target threads are identified or contacted (e.g., needed to gather information about all threads or a specified thread). Those skilled in the art will appreciate that any such differences in targets will require specialization of any debugger functionality that accesses the differences.

In the illustrated embodiment, the root nub class is a C++ class that implements a variety of low-level functions so that the derived nub classes can use the common functionality. These common functions, defined as private member functions, include functions to perform low-level communication functions such as decoding received packets from the debugger and encoding packets to send message to the debugger. Higher-level functions which may be specialized by nubs, defined by the root nub as virtual functions, include destroy, set_ttymodes, nub_remote_open, nub_remote_close, free, malloc, realloc, user_disable_debug_trap_message, setup_suicide, enable_suicide, resume, exit, detach, kill_program, sleep, evaluate_expression, read, write, find_threads, find_teams, start_program, restart_program, set_breakpoint, delete_breakpoint, set_watchpoint, delete_watchpoint, get_thread_handle, read_from_text_memory, fetch_inferior_registers, and check_version. If derived nubs must specialize the functionality, the functions can be defined as pure virtual functions. High-level requests which the debugger can make to the nubs include evaluate expression, set breakpoint, delete breakpoint, set watchpoint, delete watchpoint, get thread handle, read registers, read program memory, continue with a single-step, continue without single-stepping, detach, kill, get last signal, get protocol, get thread set, get team set, start program, restart program, and interrupt program.

FIG. 4A illustrates an exemplary sequence of instructions to be executed, and FIG. 4B illustrates an exemplary breakpoint installed within the sequence of instructions. The illustrated instructions may be executed in a parallel manner such that multiple target threads are executing the illustrated instructions at the same time, thus rendering the prior art technique of temporarily returning the replaced instruction to its original location for in-line execution infeasible.

Thus, when a user of a debugger program requests the nub for this target to add a breakpoint for instruction Y=X*Z, another technique is used. An OOL Instruction Emulation Group is first generated so that the instructions in the group can be executed in another area of memory (i.e., out-of-line), but with the same effect as if instruction Y=X*Z were executed at its original location. After the group is generated, it is installed in a free area of memory separate from the original location of the replaced instruction as shown in FIG. 4B, and information for the breakpoint handler is saved indicating the location of the group. Finally, as shown in FIG. 4B the instruction Y=X*Z is replaced with a BREAK instruction so that any thread executing these instructions will hit the breakpoint. Generation of the group can be performed by the front-end debugger program, the nub, or a target thread, and installation of the group can be performed by the nub or a target thread.

When the instructions shown in FIG. 4B are executed by a target thread, the BREAK instruction at address 2001 will cause the target thread to halt operation of the illustrated instructions and to instead transfer control to a breakpoint handler for this thread. When beginning execution, the breakpoint handler saves the current state of the target thread (e.g., the SSW, exception register, values of the general and target registers, etc.) in a save area. The breakpoint handler then determines the address of the instruction which caused the break, and it will retrieve information specific to this breakpoint. For example, when the nub creates and installs the OOL Instruction Emulation Group, the nub saves relevant information about the breakpoint (including the address of the installed group) in an accessible location. Thus, the breakpoint handler can retrieve this breakpoint information, either directly or through a request to the nub. After interacting with the debugger through the nub and receiving an instruction to resume execution, the breakpoint handler will use the address of the group as a new value for the PC, thus transferring flow of execution to the instructions in the group.

When execution continues at the instructions in the OOL Instruction Emulation Group, the instructions first retrieve information about the state of the target thread just before the breakpoint, and then restore the necessary information into the current state of the stream to allow the replaced instruction to execute. For example, if the replaced instruction needs to load information from a particular general register (e.g., a register that stores the current value of X), the previous value of that register must be made available to the instruction so that it can execute. Similarly, target registers, the values in the exception register, and the values in the upper half of the SSW may affect execution of the replaced instruction, and thus may need to be restored to provide the appropriate environment for the execution of the replaced instruction. Restoring the appropriate execution environment is described in greater detail below.

After the appropriate target thread execution environment has been restored, the replaced instruction can then be executed at its new memory location in the group. Any changes to the state of the thread must then be saved in the save area for the target thread. Thus, when the breakpoint handler finishes executing, the saved state of the target thread will reflect the thread state just after execution of the replaced instruction. For example, if the variable Y is stored in a general register and the value of that register was updated as a result of executing the replaced instruction, the stored value in the save area for that register must be updated. Similarly, the target registers, the exception register, the upper half of the SSW register, and other register counts may need to be updated. The saving of the results of the execution is described in greater detail below.

After the saved state of the target thread has been updated, the instructions in the OOL Instruction Emulation Group must ensure that the target is thread will resume execution with the instruction to be executed after the replaced instruction. In the illustrated embodiment, the OOL Instruction Emulation Group is created as a subroutine. In this embodiment, instructions in the group adjust the PC to point to the correct target instruction to be executed after the emulated instruction, and this PC is saved in the lower half of the SSW register in the save area. When the OOL Instruction Emulation Group completes execution with a RETURN instruction, flow of execution returns to the breakpoint handler. When the breakpoint handler terminates and the target thread state is restored, the adjusted PC will point to address 002001, and execution will thus resume there. Rather than ending the OOL Instruction Emulation Group with a RETURN, the last instruction could explicitly execute a jump to the correct address. In either case, the processing of the breakpoint has been performed without removing the BREAK instruction from the target code instructions. Thus, if another target thread had executed the same instructions while the breakpoint for the first target thread was being processed, the second target thread would also encounter the breakpoint instead of inadvertently missing a temporarily absent BREAK instruction.

Those skilled in the art will appreciate that a variety of other breakpoint situations are possible. For example, it is possible to set conditional breakpoints such that control of execution will transfer to the debugger only if the specified condition is true at the time that the breakpoint is hit. In some embodiments, conditional breakpoints are implemented by having the nub save the information about the condition but still using an unconditional breakpoint instruction such as BREAK. In these embodiments, the breakpoint handler will always be invoked, but the first action of the breakpoint handler can be to determine whether the breakpoint was conditional and if so whether the condition is true. In alternate embodiments, conditional breakpoints can be implemented in other ways, such as with a conditional break instruction. The breakpoint handler can request that the nub evaluate the condition and return an indication of the condition, or can instead retrieve the condition information from the nub and evaluate the condition directly. When the condition is false, the technique of the present invention allows the breakpoint handler to execute the OOL Instruction Emulation Group without ever halting to interact with the debugger program, and then continue on with the target thread execution. In this manner, the BREAK instruction present in the target code can be bypassed without OS interaction for conditional breakpoints whose conditions are false.

For example, in the illustrated embodiment the breakpoint could have been installed as a conditional breakpoint indicated to take effect only if the value of variable Z is greater than 15. Thus, if a single thread is executing each iteration of the loop, the thread will not break until later iterations when Z is greater than 15. Alternately, multiple threads may execute the loop with each thread responsible for a single possible value of Z. Thus, some threads will never break at the conditional breakpoint (e.g., the thread for which the value of Z is 10), while other threads will break (e.g., the thread for which the value of Z is 20).

Other variations on breakpoints which may require special processing by the OOL Instruction Emulation Group include replaced instructions that are transfer instructions (e.g., a JUMP or SKIP instruction) that may transfer flow of execution to an instruction other than that immediately following the transfer instruction, as well as instructions using named registers which are in use by the breakpoint handler. For transfer instructions, it is necessary to ensure that the target thread will resume execution at the appropriate instruction. When values cannot be restored to named registers prior to execution of the replaced instruction (e.g., because the breakpoint handler is using the registers), the replaced instruction added to the OOL Instruction Emulation Group can be rewritten so that other registers are used. In this situation, the restore and save environment instructions will be modified to use the replacement registers accordingly. These and other out-of-line emulation situations will be described in greater detail below.

Figure 5:
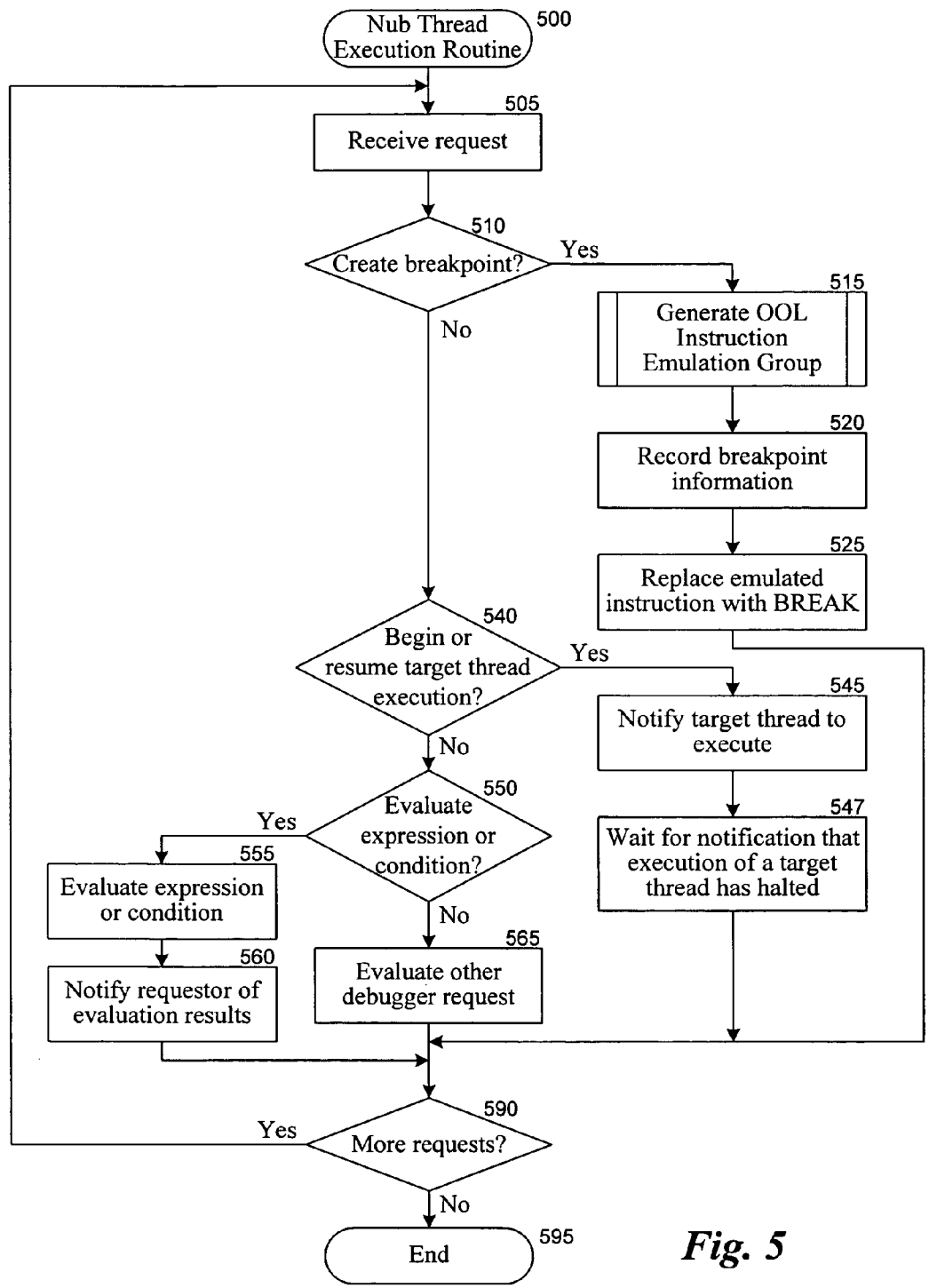
FIG. 5 is a flow diagram of an embodiment of the Nub Thread Execution routine.

FIG. 5 is a flow diagram of an embodiment of the Nub Thread Execution routine 500. The Nub Thread Execution routine receives requests and notices from executing target threads or from a debugger, and performs the requests in the context of the target being debugged. Those skilled in the art will appreciate that the execution of the nub thread can be initiated in a variety of ways, such as via direct invocation by the debugger or as part of the normal process of executing the target. In the illustrated embodiment, the target is a user application program, and the nub executes as a thread within the protection domain for the target application program task. In addition, in the illustrated embodiment all target threads are halted when any target thread executes a breakpoint, and the nub does not receive debugger requests (other than a user-initiated break such as with a Ctrl-C instruction) while target threads are executing.

The routine begins at step 505 where a request is received from a target thread or from the debugger. The routine continues at step 510 to determine whether the request is a request from the debugger to create a breakpoint at a specified instruction within the executable code of the target. If so, the routine continues to step 515 to allocate memory for the instruction group to be generated, and then invokes the Generate OOL Instruction Emulation Group subroutine 515 for the instruction to be replaced. The routine continues at step 520 where the generated instruction group is installed in the allocated memory, and information about the created group is stored in an accessible location. The stored information will include a mapping from the original address of the replaced instruction to the address of the first installed instruction of the instruction group, and may include information about the breakpoint such as the condition for a conditional breakpoint or any other information to be supplied to the breakpoint handler when this breakpoint is encountered. The routine then continues at step 525 to replace the specified instruction in the target code with a BREAK instruction.

In the illustrated embodiment, the BREAK instruction is designed to trigger an exception caused when the executing thread does not have the necessary privilege level to execute a privileged instruction. Thus, when the BREAK instruction is encountered, execution will be transferred to the trap handler for the executing thread and the trap handler will in turn invoke the privileged exception trap handler for the thread. The privileged exception trap handler will either act as the breakpoint handler and process the breakpoint directly, or will invoke a separate breakpoint handler for the thread to process the breakpoint.

In addition, as was previously discussed the nub in the illustrated embodiment executes as a task thread for the target program task. Thus, it is possible that the nub will itself execute one or more instructions for which a breakpoint has been set (e.g., the print function). It is desirable that the nub merely execute the instruction and skip the breakpoint processing performed for target threads. Thus, in the illustrated embodiment the breakpoint handler routine for the nub thread is designed to abstain from breakpoint processing. Instead, if the nub thread encounters a breakpoint, the nub thread breakpoint handler will merely execute the corresponding OOL Instruction Emulation Group for the breakpoint, and then continue normal execution.

If it was decided in step 510 that the received request was not to create a breakpoint, the routine continues at step 540 to determine if the received request is a directive from the debugger indicating to begin execution of one or more target threads or to resume execution of one or more halted target threads. If so, the routine continues at step 545 to notify the target threads to begin or continue execution as directed. When execution is resumed after a halt due to a breakpoint, execution of the OOL Instruction Emulation Group for that thread will be performed by the breakpoint handler for the thread. After step 545, the routine continues to step 547 to wait for a notification from a target thread indicating that execution of the target thread has halted. In addition to execution halts resulting from breakpoints, target threads may halt for a variety of other reasons such as executing an invalid instruction, encountering a watchpoint, having executed a specified number of instructions (e.g., single-stepping), or by receiving a user-initiated manual break directive.

If it is determined in step 540 that the received request is not a debugger directive to begin or resume target thread execution, the routine continues at step 550 to determine if the received request is a request from the debugger or from a target thread to evaluate an expression or a condition in the context of a particular target thread. If so, the routine continues at step 555 to evaluate the expression, and in step 560 notifies the requester of the result. If it was determined in step 550 that the received request was not to evaluate an expression, the routine continues at step 565 to perform some other received request from the debugger, such as to remove a breakpoint (by permanently replacing the BREAK instruction with the previously replaced instruction), to retrieve various status information about the target threads, or to send a domain signal to the target threads to halt execution of the target. Those skilled in the art will appreciate that the debugger nub can perform a variety of other functions. After steps 525, 547, 560, or 565, the routine continues at step 590 to determine if there are more requests to receive. If so, the routine returns at step 505, and if not the routine ends at step 595.

Figure 6:
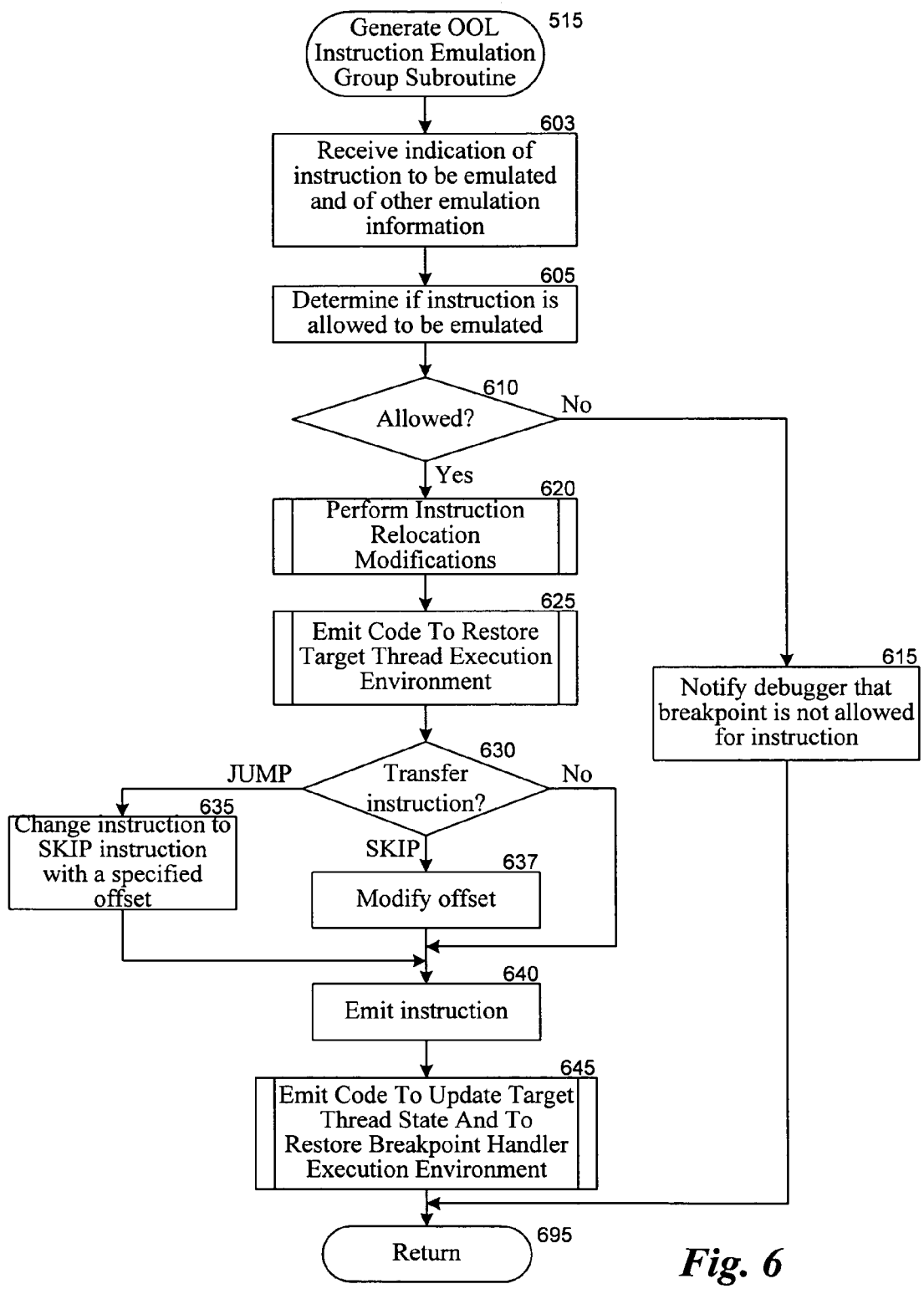
FIG. 6 is a flow diagram of an embodiment of the Generate Out-Of-Line Instruction Emulation Group subroutine.

FIG. 6 is a flow diagram of an embodiment of the Generate OOL Instruction Emulation Group subroutine 515. The subroutine receives an instruction that is to be emulated out-of-line in an area of memory separate from its original execution location, with the emulation performed so that the consequences of the instruction execution are the same as if the instruction had been executed in-line. The subroutine performs various modifications to the instruction to assist in the emulation, and then emits code to restore the original execution environment, execute the instruction and then save the state resulting from the execution.

The subroutine begins at step 603 where an indication of the instruction to be replaced, the address of the instruction and the address of the OOL Instruction Emulation Group installation location are received. The subroutine continues to step 605 to determine if the instruction is allowed to be emulated. For example, in some embodiments some instructions are too complex to be emulated. In the illustrated embodiment, the instructions STREAM_CREATE_IMM, TRAP*, LEVEL*, DATA_OP*, DOMAIN*, STREAM_CATCH, and RESULTCODE_SAVE are not allowed to be emulated. Those skilled in the art will appreciate that various factors can be considered when determining which codes are either impossible to emulate or for whom the effort required for emulation is not worth the benefit.

The subroutine continues to step 610, and if it is indicated that the instruction is not allowed to be emulated then the subroutine continues to step 615 to notify the debugger that a breakpoint is not allowed to be set for the indicated instruction. Those skilled in the art will appreciate that in other embodiments a breakpoint could be added and processed in-line, either requiring all of the threads to halt during any temporary return of the replaced instruction to be executed in-line after the breakpoint has been processed or accepting that some threads may miss the breakpoint during the temporary return. If it is instead indicated in step 610 that the instruction is allowed to be emulated, the subroutine continues to step 620 to execute subroutine 620, which performs the necessary modifications to the instruction to allow it to be emulated in its new memory location. The subroutine then continues to step 625 to execute subroutine 625, which emits code for the OOL Instruction Emulation Group that when executed will restore the execution environment of the target thread just before the breakpoint was encountered.

The subroutine next performs special processing if the instruction to be emulated is a transfer instruction (or if a multi-operation emulated instruction contains a transfer operation). In the illustrated embodiment, transfer instructions are either conditional SKIP or conditional JUMP instructions. The subroutine first continues to step 630 to determine if the instruction is a transfer instruction. If the instruction is a JUMP instruction, the subroutine continues to step 635 to change the instruction to be emulated to be a SKIP instruction with a specified offset that will invoke appropriate code in the OOL Instruction Emulation Group that will be emitted. Alternately, if it was determined in step 630 that the instruction is a SKIP instruction, the subroutine continues to step 637 to modify the SKIP offset to be the specified offset so that the modified SKIP will invoke the appropriate code in the OOL Instruction Emulation Group. As will be described in greater detail with respect to subroutine 645 described in FIG. 9, when a conditional branch of the modified SKIP instruction is taken, the specified offset will skip to the instructions to be emitted in step 920 of FIG. 9. After steps 635 or 637, the subroutine continues to step 640 to emit the SKIP instruction to the OOL Instruction Emulation Group. If it is instead determined in step 630 that the instruction is not a transfer instruction, the subroutine continues directly to step 640 and emits the instruction without modification. Special processing is required for emulated transfer instructions since particular instructions in the OOL Instruction Emulation Group after the emulated instruction must be executed, such as those that save the state of the target thread after the emulated instruction execution, and thus the flow of execution with the OOL Instruction Emulation Group must be controlled. Moreover, since conditional transfer instructions may alter the PC for the target thread, special processing for such instructions is required by later OOL Instruction Emulation Group instructions to appropriately save the new target thread state.

Thus, after step 640 the subroutine next executes subroutine 645, which emits instructions to update the saved state of the target thread to reflect any changes occurring from execution of the emulated instruction. The emitted instructions then restore the breakpoint handler execution environment to enable a smooth transition from the breakpoint handler back to the target thread processing. If the emulated instruction is a transfer instruction, whether conditional or not, instructions will be emitted to handle the situation. After step 645 or step 615, the subroutine returns at step 695. Those skilled in the art will appreciate that the particular instructions necessary for out-of-line emulation will vary with the particular computer system architecture on which the emulation is to take place.

Figure 7:
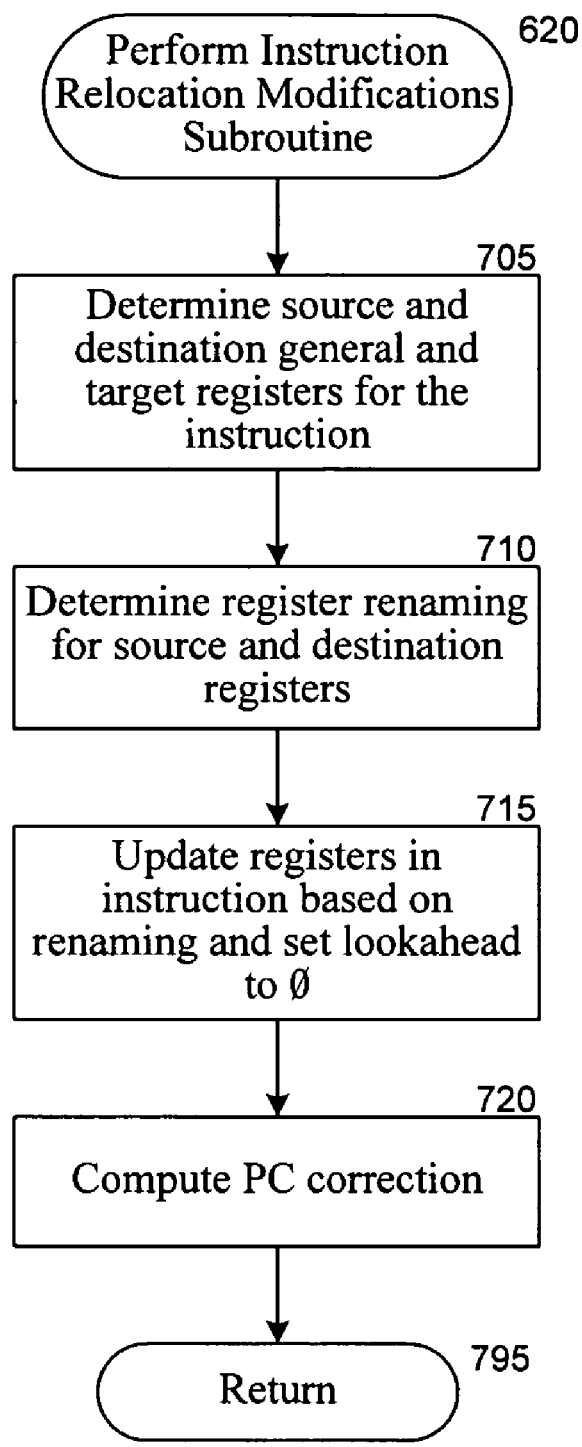
FIG. 7 is a flow diagram of an embodiment of the Perform Instruction Relocation Modifications subroutine.

FIG. 7 is a flow diagram of an embodiment of the Perform Instruction Relocation Modifications subroutine 620. The subroutine determines any changes that must be made in the form of the instruction to be emulated that result from the instruction being executed at a different memory location and in the context of the breakpoint handler rather than the target thread. In particular, the subroutine determines if the instruction will use any source general or target registers to supply information (e.g., such as a load operation from a register), and then determines if those source registers are available to be used or are already in use by the breakpoint handler. Similarly, the subroutine determines whether execution of the emulated instruction will modify any values in any destination general or target registers, and again determines whether those registers are currently available. For any source or destination registers which are not available, the subroutine identifies other appropriate registers which are available and alters the emulated instruction to use the new registers rather than the old. The subroutine also calculates the address of the instruction to be executed following execution of the emulated instruction, and modifies the emulated instruction so that its lookahead value is zero (i.e., and thus must finish execution before the following instruction can be executed).

The subroutine begins at step 705 where any source and destination general and target registers for the instruction are identified. The subroutine then continues to step 710 to determine if register renaming is necessary for any of the registers, and if so to identify available registers. The subroutine then continues to step 715 to update the registers in the instruction, if necessary, to reflect any renamed registers, and also sets the instruction's lookahead value to be zero. The subroutine then continues to step 720 to compute a PC correction such that addition of the PC correction to the PC resulting from execution of the emulated instruction will generate a pointer to the instruction to be executed after the emulated instruction. The subroutine then continues to step 795 and returns.

Figure 8:
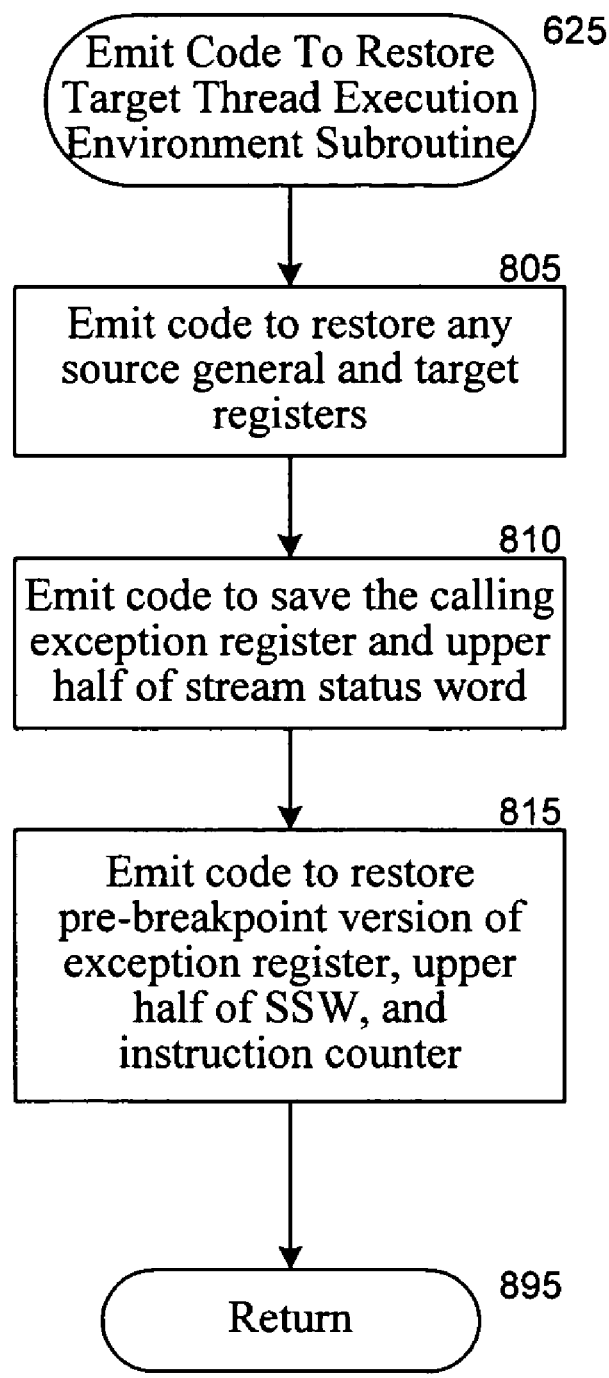
FIG. 8 is a flow diagram of an embodiment of the Emit Code To Restore Target Thread Execution Environment subroutine.

FIG. 8 is a flow diagram of an embodiment of the Emit Code To Restore Target Thread Execution Environment subroutine 625. The subroutine emits code that when executed just prior to execution of the emulated instruction will restore the relevant thread environment that existed just prior to encountering the breakpoint. In particular, the emitted code will load the appropriate source registers (using register renaming mapping if necessary) so that the values retrieved by the instruction are the same as if the instruction had been executed in-line. The subroutine also emits code that restores the state of the exception register, upper half of the SSW, and the instruction count that existed just before the breakpoint was encountered.

The subroutine begins at step 805 where the code to restore the appropriate source registers is emitted. The subroutine continues to step 810 to emit the code to save the current exception register and the upper half of the SSW (the non-PC portion). The subroutine then continues to step 815 to restore the values of the exception register, upper half of the SSW, and instruction count that existed just prior to encountering the breakpoint. The instruction count is a variable supported in hardware that allows the debugger to maintain a count of how many instructions have been executed by the thread, thus allowing the debugger to know when a specified number of instructions have been executed. Since a series of instructions will be executed in an OOL Instruction Emulation Group in place of a single emulated instruction, the value of the instruction count must be specifically handled so that it reflects only the execution of the emulated instruction. Moreover, if in-line execution of the emulated instruction would have caused the instruction count variable to reach a value predetermined to execute a trap, the OOL Instruction Emulation Group delays processing of that trap until the appropriate breakpoint handler state has been restored. After step 815, the subroutine continues to step 895 and returns.

Figure 9:
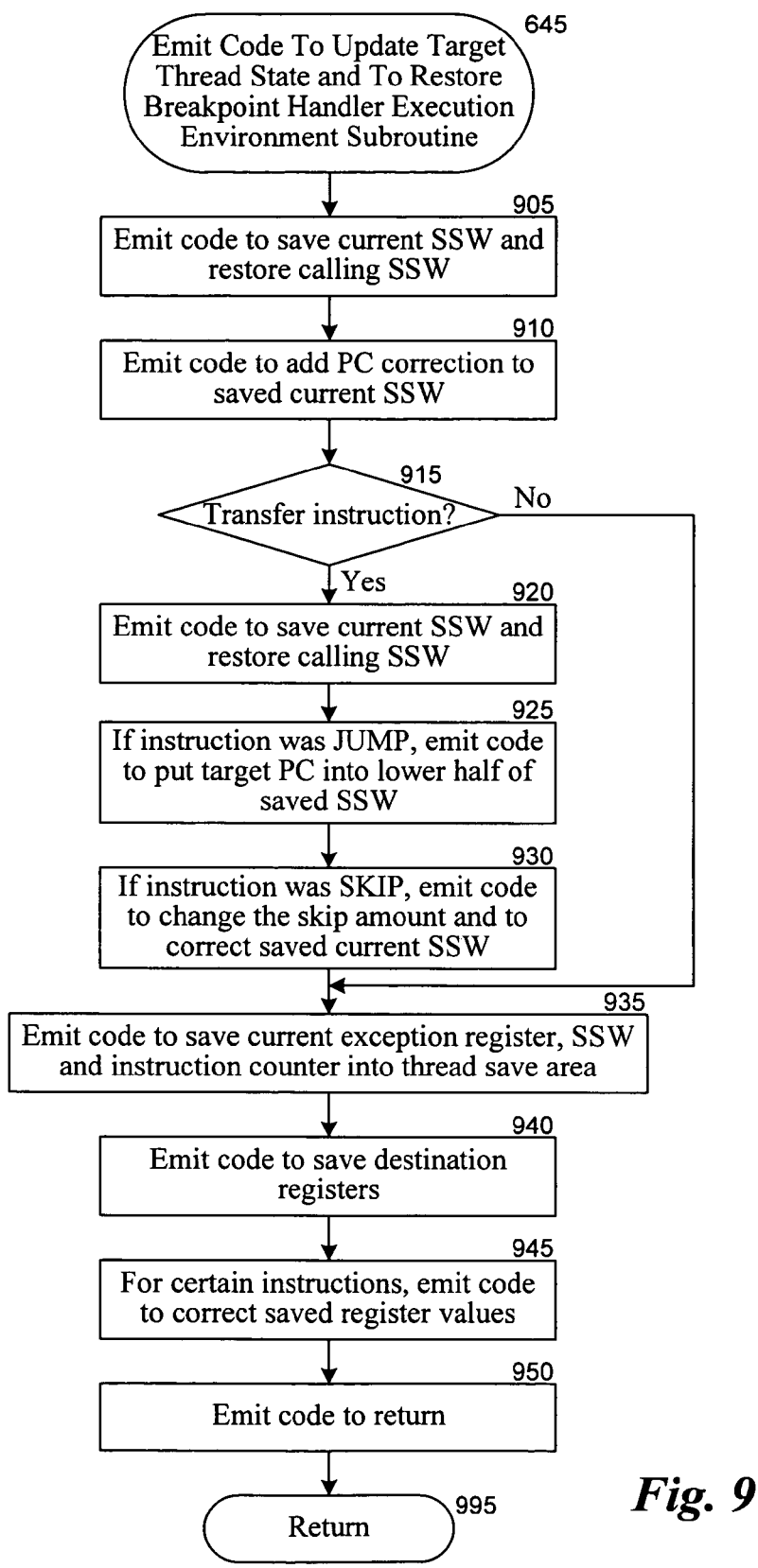
FIG. 9 is a flow diagram of an embodiment of the Emit Code To Update Target Thread State And To Restore Breakpoint Handler Execution Environment subroutine.

FIG. 9 is a flow diagram of an embodiment of the Emit Code To Update Thread State And To Restore Breakpoint Handler Execution Environment subroutine 645. The subroutine emits the necessary code that will save the state of the target thread after execution of the emulated instruction, and then restores the execution environment of the breakpoint handler. In particular, the updated values of the exception register, upper half of the SSW, and instruction count will be saved in the target thread save area. In addition, code will be emitted to modify the PC in the lower half of the SSW before the save so that it points to the instruction to be executed after the emulated instruction.

The subroutine begins in steps 905 through 910 by emitting code that is appropriate if the emulated instruction in the OOL Instruction Emulation Group is not a transfer instruction or in which a conditional branch of a transfer instruction is not taken. In that situation, the code to be emitted in steps 905 through 910 will be executed just after the execution of the emulated instruction. In step 905, the subroutine emits code to save the upper half of the current SSW, and to restore the previously saved SSW for the breakpoint handler. The subroutine continues to step 910 to emit code that will add the previously calculated PC correction to the lower half of the just-saved SSW so that the PC will point to the appropriate instruction.

The subroutine next continues to step 915 to determine if the emulated instruction is a transfer instruction. If so, special processing of the transfer instruction is required, and in steps 920 through 930 the subroutine will emit code to handle the situation in which the emulated instruction was a transfer instruction. If the emulated instruction is a transfer instruction, the instruction will have been modified earlier, as described with respect to FIG. 6, to be a SKIP instruction with an offset that points to the code to the emitted in step 920. If the emulated instruction is not a transfer instruction, it is not necessary to emit the code to handle this situation. Thus, if the emulated instruction is a transfer instruction, the subroutine continues to step 920 to first emit code to save the upper half of the SSW and to restore the SSW that was previously saved for the breakpoint handler. The subroutine then continues to step 925 to determine if the emulated instruction was originally a JUMP instruction, and if so to then emit code to put the target PC of the jump instruction into the lower half of the just-saved SSW. The subroutine continues to step 930 to determine if the emulated instruction was originally a SKIP instruction, and if so to then emit code to update the PC in the lower half of the saved SSW to reflect the PC correction in the skip amount.

After step 930, or if it was determined in step 915 that the emulated instruction is not a transfer instruction, the subroutine continues to step 935 to emit code to transfer the exception register, the saved version of the SSW, and the instruction count to the save area for the target thread. The subroutine then continues to step 940 to emit code that saves the values modified in any destination general or target registers by the emulated instruction to the appropriate registers in the save area, using the register renaming mapping if necessary to modify the appropriate registers. The subroutine continues to step 945 to determine if the emulated instruction is one that modifies an address stored in a register by a specified offset amount, and if so emits code to correct the address in that register for the saved area. For example, in the illustrated embodiment instructions such as SSW_DISP and TARGET_*DISP will need to be corrected. The subroutine then continues to step 950 to emit code to the OOL Instruction Emulation Group to cause a return, and the subroutine then continues to step 995 and itself returns. In the illustrated embodiment, the OOL Instruction Emulation Group is implemented as a subroutine, thus allowing any processing to be performed to be stored temporarily on the stack and to then be removed after the OOL Instruction Emulation Group returns. Those skilled in the art will appreciate that other implementations of the OOL Instruction Emulation Group are possible (e.g., having an explicit JUMP to the instruction to be executed after the emulated instruction).

Figure 10:
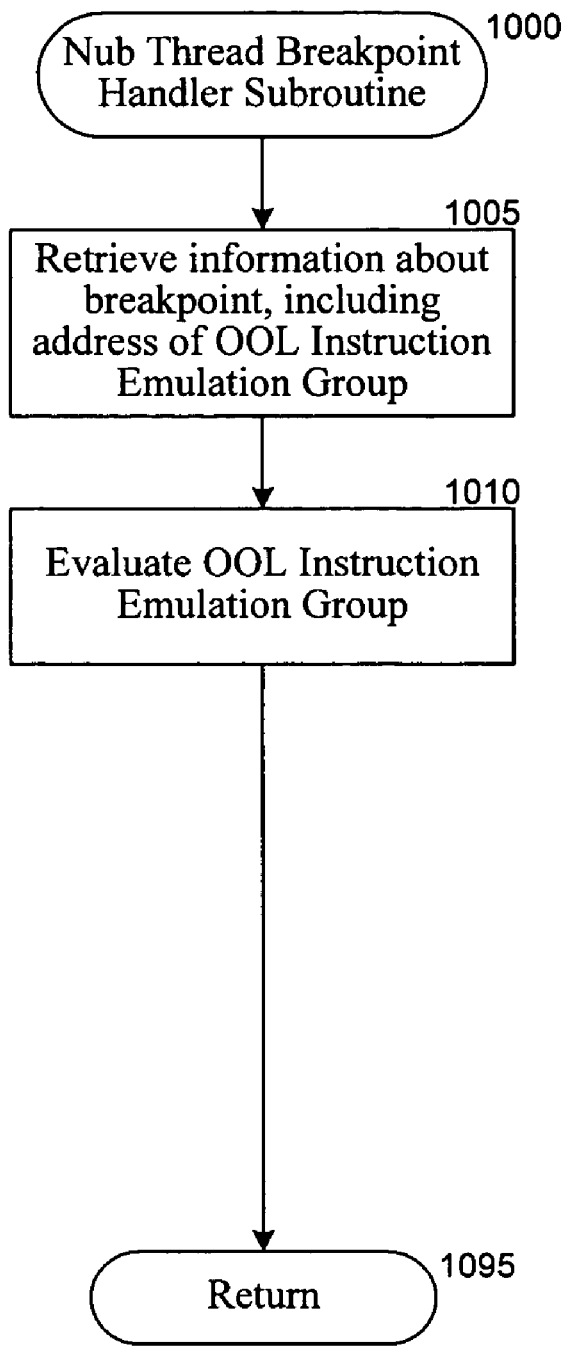
FIG. 10 is a flow diagram of an embodiment of the Nub Thread Breakpoint Handler subroutine.

FIG. 10 is a flow diagram of an embodiment of the Nub Thread Breakpoint Handler subroutine 1000. As previously indicated, each thread can have a different trap handler than other threads for the same task, and in particular can be defined with different implementations of the breakpoint handler. In the illustrated embodiment, the nub executes in a thread separate from the target threads. In addition, it is desirable for the nub to avoid interacting with the debugger if the nub encounters a breakpoint. Thus, the breakpoint handler for the nub merely executes the OOL Instruction Emulation Group when a breakpoint is encountered, and then returns. Those skilled in the art will appreciate that in alternate embodiments, a single breakpoint handler routine could be used for all threads and that breakpoint handler could choose to forego interaction with the debugger when the breakpoint handler is executed for some threads (e.g., the nub). In addition, those skilled in the art will also appreciate that in some embodiments it may be useful for some target threads to process breakpoints differently than other target threads, and can thus be defined with other differing breakpoint handlers.

This subroutine begins at step 1005 after a breakpoint has been encountered and the privileged instruction exception handler has transferred flow control to the breakpoint handler. In step 1005, the subroutine retrieves saved information about the breakpoint from when the breakpoint was created, including the beginning address for the OOL Instruction Emulation Group corresponding to the breakpoint. The subroutine then continues to step 1010 where it executes the instructions in the OOL Instruction Emulation Group, thus performing the codes emitted into the OOL Instruction Emulation Group when the instruction group was generated. The subroutine ignores various other information about the breakpoint, such as whether or not the breakpoint is conditional, since the subroutine is designed to continue execution of the nub thread as if a breakpoint had not been encountered. Those skilled in the art will appreciate that other instructions (e.g., providing status notification to a log file or to the debugger) could be performed in addition to the OOL Instruction Emulation Group. After step 1010, the subroutine continues to step 1095 and returns, thus returning execution to the nub thread at the instruction following execution of the emulated instruction.

Figure 11:
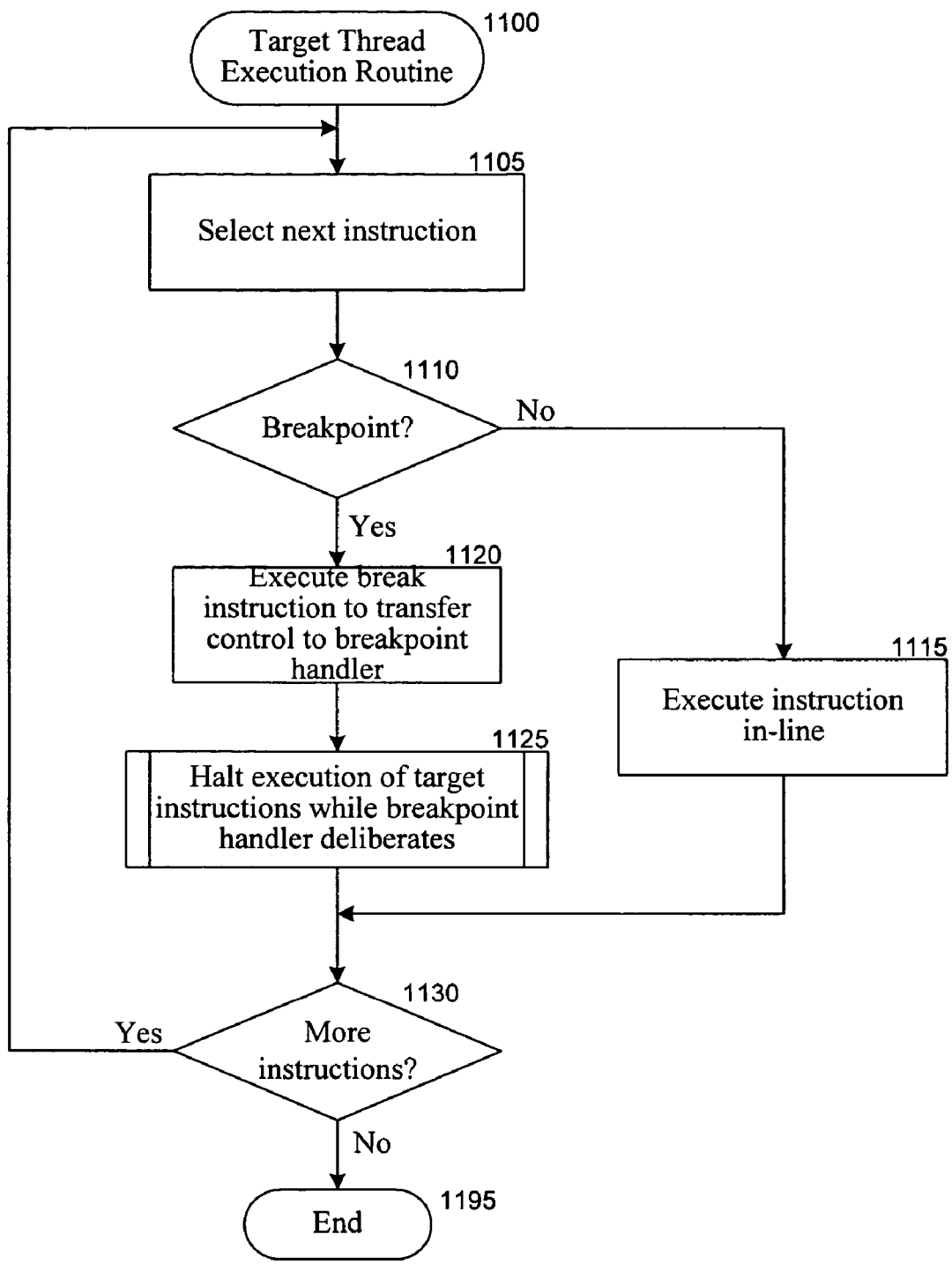
FIG. 11 is a flow diagram of an embodiment of the Target Thread Execution routine.

FIG. 11 is a flow diagram of an embodiment of the Target Thread Execution routine 1100. The routine is invoked when a thread is created as part of the normal execution of the target. The routine executes target instructions in a normal manner until a breakpoint is encountered, then transferring the flow of control to the breakpoint handler which executes on the stream until the debugger indicates that execution of the target should continue.

The routine begins at step 1105 where the next target instruction to be executed is selected, beginning with the first instruction upon initial execution of the stream. The routine then continues to step 1110, with flow of execution varying depending on whether the current instruction is a breakpoint. If the current instruction is not a breakpoint, the routine continues to step 1115 where the instruction is executed in-line in a normal fashion. If the current instruction is instead a breakpoint, the routine continues to step 1120, where attempted execution of a BREAK instruction will cause a privileged instruction exception to be raised, thus transferring flow of control to the privileged instruction exception handler for this thread which in turn invokes the breakpoint handler for the thread. Thus, the routine continues to step 1125 where execution of the target instructions are halted while the target thread breakpoint handler executes. After the target thread breakpoint handler finishes executing in step 1125, or after step 1115, the routine continues to step 1130 to determine if there are more instructions. The target instruction sequence can indicate the end of the sequence in a variety of ways, such as with an explicit termination instruction like QUIT or a RETURN. Alternately, it may be possible in some embodiments to execute a target instruction sequence for any arbitrary set or length of instructions. If it is determined in step 1130 that there are more instructions, the routine returns to step 1105 to select the next instruction, and if not the routine ends at step 1195.

Figure 12:
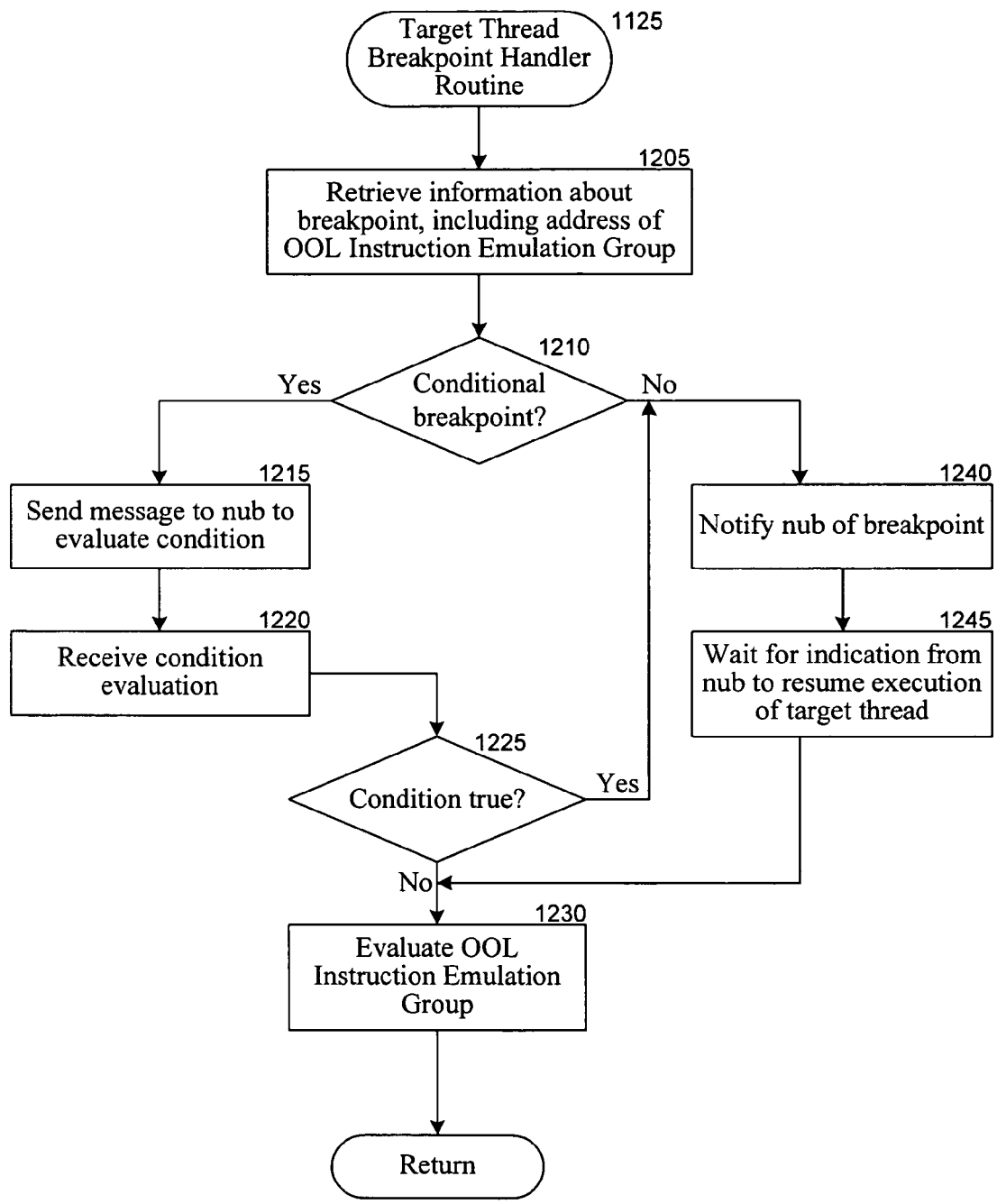
FIG. 12 is a flow diagram of an embodiment of the Target Thread Breakpoint Handler subroutine.

FIG. 12 is a flow diagram of an embodiment of the Target Thread Breakpoint Handler subroutine 1125. This subroutine is invoked when a breakpoint is encountered by a target thread, thus transferring control to the breakpoint handler. The breakpoint handler retrieves information from the nub about the breakpoint, such as the address of the OOL Instruction Emulation Group for the breakpoint and whether or not the breakpoint is conditional. If the breakpoint is conditional and is not currently valid, the subroutine merely executes the OOL Instruction Emulation Group and then continues execution of the target thread. In this manner, conditional breakpoints can be implemented in a very lightweight fashion without OS interaction or without halting other target threads. If it is instead determined that the breakpoint is valid, the subroutine notifies the nub of the breakpoint and responds to any requests from the nub. Upon an indication from the nub to resume execution, the subroutine evaluates the OOL Instruction Emulation Group and continues execution of the target thread.

This subroutine begins at step 1205 where various information regarding the breakpoint is retrieved from the nub, including the address for the OOL Instruction Emulation Group corresponding to the breakpoint as well as information on whether or not the breakpoint is conditional. The subroutine continues to step 1210 to determine if the breakpoint is conditional, and if so continues to step 1215 to evaluate the condition. In the illustrated embodiment, a message is sent to the nub to request evaluation of the condition, and in step 1220 a response is received from the nub. Those skilled in the art will appreciate that in an object-oriented environment, a member function of the nub can be invoked to communicate with the nub and to evaluate the condition. In an alternate embodiment, the subroutine can directly evaluate the condition rather than requesting the nub to perform the evaluation. One advantage to having the subroutine directly evaluate the condition is that each target thread can independently and simultaneously evaluate conditions, rather than having the nub be a bottleneck.

After step 1220, the subroutine continues to step 1225 to determine if the condition for the conditional breakpoint is currently valid. If not, then the breakpoint is not enforced for this thread at the current time, and the subroutine continues to step 1230 to evaluate the OOL Instruction Emulation Group corresponding to the breakpoint. After 1230, the subroutine continues to step 1295 and returns, thus returning resuming execution of the target thread.

Those skilled in the art will appreciate that the OOL Instruction Emulation Group could be used in other manners than to implement breakpoints. For example, the ability to emulate an instruction out-of-line could allow a wide variety of types of instructions to be added at a specified location in target code. A user could specify instructions that are to be executed before or after a target instruction, and these instruction could be added to an OOL Instruction Emulation Group created for the target instruction. If a conditional breakpoint whose condition will never be true is added for the target instruction, the effect will be that the newly added instructions will be executed when the breakpoint is encountered, with the falsity of the condition preventing the breakpoint handler from halting execution of the target thread. This ability to add functionality to compiled target code can be used in a variety of ways.

If it was instead determined in step 1210 that the breakpoint was not conditional or in step 1225 that the condition on the conditional breakpoint was true, the subroutine continues to step 1240 to notify the debugger nub that a breakpoint has occurred. The subroutine then continues to step 1245 to wait for any messages from the nub, processing and responding to any requests. When an indication is received from the nub to resume execution of the target thread, the subroutine continues to step 1230 to evaluate the OOL Instruction Emulation Group. Those skilled in the art will appreciate that interactions between a target thread and the nub can be implemented in a variety of ways (e.g., socket-based message passing or direct access of shared task memory), and that either the nub or the target thread can perform actions such as the evaluating of expressions or conditions. In addition, even when the nub is responsible for functionality such as the evaluation of expressions, the nub may retrieve various information from the threads (e.g., the values of variables), either through direct memory access or through requests sent to the breakpoint handler for the thread.

From the foregoing it will be appreciated that, although specific embodiments of the invention have been described herein for purposes of is illustration, various modifications may be made without deviating from the spirit and scope of the invention. Accordingly, the invention is not limited except as by the appended claims.

The invention claimed is:

1. A computer-implemented method for executing a breakpoint instruction without removing the breakpoint instruction from an executing target program, the target program having a multiple software threads each able to execute without halting execution of the other threads, the method comprising:

executing the target program using a target program thread;

placing a breakpoint at a first location of a first instruction in the target program;

installing an OOL instruction emulation group for the first instruction replaced by the breakpoint in an area of memory different from the first location;

responsive to receiving an indication to assume execution of the target program, executing the OOL instruction emulation group at its installed location; and subsequent to executing the OOL instruction emulation group, resuming execution of the target program by executing a second instruction at a second location immediately after the first location in the target program.

2. The method of claim 1, wherein the target program is an application program.

3. The method of claim 1, wherein the target program is an operating system.

4. The method of claim 1, wherein the OOL instruction emulation group is generated by a front-end debugger program.

5. The method of claim 1, wherein the OOL instruction emulation group is generated by a debugger nub.

6. The method of claim 1, wherein the OOL instruction emulation group is generated by the target program thread.

7. The method of claim 1, wherein the OOL instruction emulation group is installed by a debugger nub.

8. The method of claim 1, wherein the OOL instruction emulation group is installed by the target thread program.

9. The method of claim 1, wherein the OOL instruction emulation group is a subroutine of the target program.

10. The method of claim 1, wherein the OOL instruction emulation group is executed by a breakpoint handler.

11. A computer-implemented method for executing a breakpoint instruction without removing the breakpoint instruction from an executing target program, the target program having a multiple software threads each able to execute without halting execution of the other threads, the method comprising:
    in an executing target program, receiving a request to add a breakpoint for a first instruction at a first location in the target program;
    generating an OOL instruction emulation group for the first instruction;
    installing the OOL instruction emulation group in a free area of memory separate from the first location;
    saving an indication of the location of the OOL instruction emulation group; and
    replacing the first instruction with a break instruction.

12. The method of claim 11 further comprising:
    in the executing target program, executing the break instruction causes the target program thread to:
        halt execution of the target program; and
        transfer control to a breakpoint handler for the target program thread.

13. The method of claim 11, wherein the OOL instruction emulation group comprises instructions for:
    retrieving information about the state of the target program thread just prior to the breakpoint;
    restoring the target program thread execution environment; and
    executing the first instruction from its location within the OOL instruction emulation group.

14. A computer-readable medium having stored thereon computer instructions that, when executed by a computer, cause the computer to:
    generate an OOL instruction emulation group for an instruction in an area of memory in an executing target program in a target program thread;
    install the OOL instruction emulation group in an area of memory different from the area of memory in the executing target program;
    save an indication of the area of memory in which the OOL instruction emulation group is installed; and
    replace the instruction in the area of memory in the executing target program with a break instruction.

15. The computer-readable medium of claim 14 further comprising instructions that, when executed by a computer, cause the computer to:
    halt execution of the target program thread upon encountering the break instruction; and
    transfer control to a breakpoint handler for the target program thread, such that the breakpoint handler transfers flow of execution to the OOL instruction emulation group in response to an instruction to resume execution of the target program.

16. The computer-readable medium of claim 14, wherein the OOL instruction emulation group is executed in the area of memory different from the area of memory in the executing target program.

17. The computer-readable medium of claim 14, wherein the OOL instruction emulation group ensures that the target program resumes execution after the replaced instruction.

18. The computer-readable medium of claim 14, wherein the OOL instruction emulation group retrieves state information of the target program thread just before encountering the breakpoint instruction.

19. The computer-readable medium of claim 14, wherein the OOL instruction emulation group is a subroutine of the target program.

20. A computer-readable storage medium containing instructions for executing a breakpoint instruction by a method, the method comprising:
    executing a target program in a target program thread, the target program having a break instruction at a first location, the break instruction replacing a first instruction formerly located at the first location;
    providing an OOL instruction emulation group comprising a plurality of instructions including the first instruction, the OOL instruction emulation group operable to execute in a free area of memory separate from the first location; and
    executing a breakpoint handler operable to interact with a debugger program, the breakpoint handler operable to transfer flow of execution to the OOL instruction group subsequent to interacting with the debugger program.

21. The computer-readable storage medium of claim 20 further comprising providing a front-end debugger program operable to generate the OOL instruction emulation group.

22. The computer-readable storage medium of claim 20 further comprising providing a nub operable to generate the OOL instruction emulation group.

23. The computer-readable storage medium of claim 20, wherein the breakpoint handler is operable to interact with the debugger program through a nub.

24. The computer-readable storage medium of claim 23, wherein the nub executes as part of the target program thread.

25. The computer-readable storage medium of claim 20, wherein the breakpoint instruction is a conditional breakpoint instruction.

26. The computer-readable storage medium of claim 23, wherein the nub executes using a separate thread within the target program thread.

27. A computer-implemented method for debugging an executing target program having multiple software threads each able to execute without halting execution of the other threads and having at least one breakpoint set in such a manner that encountering the breakpoint causes a break to occur, the method comprising:
    executing a first program using a thread of the target program;
    executing the target program using the other target program threads;
    when one of the other target program threads encounters one of the set breakpoints during execution of the target program and causes a break to occur, halting execution of the one of the other target program thread until an indication is received from the first program to resume execution; and when the executing first program thread encounters one of the set breakpoints and causes a break to occur, continuing execution of the first program thread without receiving an external indication to continue the execution.

28. The method of claim 27 including, when one of the executing other target program threads encounters one of the set breakpoints during execution of the target program and causes a break to occur, notifying a debugger of the encounter.

29. The method of claim 28 wherein the indication that is received by the other target program thread from the first program to resume execution is forwarded from the debugger to that other target program thread by the first program.

30. The method of claim 28 wherein the notifying of the debugger includes notifying the first program so that the first program can notify the debugger.

31. The method of claim 27 wherein, when the executing first program thread encounters one of the set breakpoints and causes a break to occur, the continuing of the execution of the thread is performed without notifying a debugger of the encounter.

32. The method of claim 27 wherein the target program includes multiple executable instructions that are stored in memory, wherein the setting of a breakpoint includes replacing an executable instruction stored in memory with a breakpoint instruction, and wherein the encounter of the set breakpoint includes attempting to execute one of the target program instructions that was replaced by a breakpoint instruction.

33. The method of claim 32 wherein the resuming of the execution includes executing that one replaced target program instruction without returning that one replaced target program instruction to its original memory location.

34. The method of claim 32 wherein the continuing of the execution includes executing that one replaced target program instruction without returning that one replaced target program instruction to its original memory location.

35. The method of claim 27 including:
when one of the executing other target program threads performs an operation that triggers an exception, immediately transferring control of execution for that thread to an exception handler for that thread so that the exception handler can process the exception; and when the executing first program thread performs an operation that triggers an exception, deferring transferring control of execution for the first program thread to an exception handler for the thread until the first program has completed a specified assignment.

36. The method of claim 35 wherein the deferring of the transferring of the control includes masking exceptions that occur during performance of the specified assignment.

37. The method of claim 35 wherein the deferring of the transferring of the control is permanent such that the specified assignment continues until execution of the first program is completed.

38. The method of claim 35 including, when the executing first program thread performs an operation that triggers an exception, notifying an executing debugger of the exception.

39. The method of claim 27 including:
when one of the executing other target program threads performs an operation that triggers a fatal trap, immediately transferring control of execution for that thread to a trap handler for that thread to halt execution of the thread; and when the executing first program thread performs an operation that triggers a fatal trap, blocking transferring control of execution for the first program thread to a trap handler that will halt execution of the thread.

40. The method of claim 39 including, before the performance of the operation by the executing first program thread that triggers the fatal trap, rebinding the trap handler for the first program thread to a different trap handler that will not halt execution of the thread, and wherein the blocking of the transferring of the control includes transferring the control of execution for the first program thread to the different trap handler.

41. The method of claim 39 wherein the blocking of the transferring of the control includes notifying an executing debugger of the fatal trap.

42. The method of claim 27 wherein the set breakpoint encountered by one of the executing other target program threads during the execution of the target program is a conditional breakpoint that includes a condition, and wherein the halting of the execution of the thread includes requesting the first program to evaluate the condition.

43. The method of claim 42 wherein the received indication from the first program to resume execution is an indication that the condition is evaluated to be false, so that conditional breakpoints with false conditions are treated as if a break did not occur.

44. The method of claim 27 wherein the set breakpoint encountered by one of the executing other target program threads during the execution of the target program is a conditional breakpoint that includes a condition, and including, before the halting:
under control of that executing other target program thread, evaluating the condition to determine if the condition is satisfied; and when it is determined that the condition is not satisfied, resuming the execution of that executing other target program thread without halting the execution, such that the halting of the execution of that executing other target program thread occurs only when the condition is determined to be satisfied.

45. The method of claim 27 wherein a debugger in communication with the first program is executing on a remote computer.

46. The method of claim 27 wherein the target program executes on a processor that has multiple hardware streams each able to execute at least one of the target program threads.

47. The method of claim 46 wherein the processor has multiple protection domains that are each able to execute a program, and wherein the target program executes in at least one of the protection domains.

* * * * *

UNITED STATES PATENT AND TRADEMARK OFFICE
CERTIFICATE OF CORRECTION

PATENT NO. : 7,428,727 B2 Page 1 of 1
APPLICATION NO. : 10/937688
DATED : September 23, 2008
INVENTOR(S) : Alverson et al.

It is certified that error appears in the above-identified patent and that said Letters Patent is hereby corrected as shown below:

In column 1, line 67, before "registers" delete "is".

In column 3, line 19, delete "domain signal" and insert -- domain_signal --, therefor.

In column 3, line 21, delete "domain signal" and insert -- domain_signal --, therefor.

In column 3, line 32, delete "overidden" and insert -- overridden --, therefor.

In column 3, line 50, delete "References." and insert -- references. --, therefor.

In column 14, line 5, before "thread" delete "is".

In column 22, line 43, before "illustration," delete "is".

Signed and Sealed this

Second Day of December, 2008

JON W. DUDAS
*Director of the United States Patent and Trademark Office*